(12) United States Patent
    Evans

(10) Patent No.: US 11,498,440 B2
(45) Date of Patent: Nov. 15, 2022

(54) VEHICLE TRAFFIC AND CHARGE MANAGEMENT SYSTEM USING AUTONOMOUS CLUSTER NETWORKS OF VEHICLE CHARGING STATIONS

(71) Applicant: Michael Steward Evans, Los Gatos, CA (US)

(72) Inventor: Michael Steward Evans, Los Gatos, CA (US)

( * ) Notice: Subject to any disclaimer, the term of this patent is extended or adjusted under 35 U.S.C. 154(b) by 0 days.

(21) Appl. No.: 16/725,745

(22) Filed: Dec. 23, 2019

(65) Prior Publication Data

US 2020/0207230 A1    Jul. 2, 2020

Related U.S. Application Data

(60) Provisional application No. 62/785,088, filed on Dec. 26, 2018.

(51) Int. Cl.
    *B60L 53/31*     (2019.01)
    *B60L 53/36*     (2019.01)
    (Continued)

(52) U.S. Cl.
    CPC .............. *B60L 53/36* (2019.02); *B60L 53/30* (2019.02); *B60L 53/31* (2019.02); *B60L 53/34* (2019.02); *B60L 53/35* (2019.02); *B60L 53/50* (2019.02); *B60L 53/55* (2019.02); *B60L 53/66* (2019.02); *B64F 1/362* (2013.01); *H02J 7/0045* (2013.01);
    (Continued)

(58) Field of Classification Search
    CPC ......... B60L 53/36; B60L 53/66; B60L 53/30; B60L 53/50; B60L 53/35; B60L 53/34; B60L 53/31; B60L 53/55; B60L 2200/10; H02J 50/10; H02J 7/0045; H02J 7/345; B64F 1/362; B64C 2201/201; B64C 2201/20
    See application file for complete search history.

(56) References Cited

U.S. PATENT DOCUMENTS

2014/0103158 A1*  4/2014  Berry ................ B64C 29/0033
                                                244/2
2014/0379156 A1* 12/2014  Kamel ................ G01D 21/00
                                                700/291
(Continued)

OTHER PUBLICATIONS

Research on super capacitor voltage balancing of electric vehicle charging stations Sun Dongyang, Wu fengjiang, Sun Iizhi, Zhang yuanbo, Published in IEEE Dec. 17, 2015 (Year: 2015).*

*Primary Examiner* — Christian Chace
*Assistant Examiner* — Jordan S Fei
(74) *Attorney, Agent, or Firm* — Donald R. Boys; Central Coast Patent Agency LLC

(57) ABSTRACT

A control system and apparatus for managing charging of electric vehicles in a transportation infrastructure and controlling at least the flight paths for drone-assisted vehicles requiring periodic charge comprises a transportation system control node connected in a first wide area network (WAN), a plurality of vehicle charging facilities distributed within the geographic region covered by the first wide area network and a charge controller connected to each of the plurality of charging facilities for brokering electric power from a power source to at least one structurally supported charge transfer apparatus maintained at each of the charging facilities.

18 Claims, 22 Drawing Sheets

(51) Int. Cl.
  *H02J 50/10*  (2016.01)
  *H02J 7/00*  (2006.01)
  *B64F 1/36*  (2017.01)
  *B60L 53/55*  (2019.01)
  *B60L 53/66*  (2019.01)
  *B60L 53/30*  (2019.01)
  *B60L 53/50*  (2019.01)
  *B60L 53/35*  (2019.01)
  *B60L 53/34*  (2019.01)
  *H02J 7/34*  (2006.01)

(52) U.S. Cl.
  CPC ........... *H02J 50/10* (2016.02); *B60L 2200/10* (2013.01); *H02J 7/345* (2013.01)

(56) References Cited

U.S. PATENT DOCUMENTS

| | | | |
|---|---|---|---|
| 2016/0016476 A1* | 1/2016 | Lovshin | H02K 53/00 |
| | | | 290/45 |
| 2016/0137311 A1* | 5/2016 | Peverill | B60L 53/68 |
| | | | 244/110 C |
| 2016/0376031 A1* | 12/2016 | Michalski | G08G 5/0026 |
| | | | 701/15 |
| 2017/0182901 A1* | 6/2017 | Lee | B64F 1/005 |
| 2018/0074485 A1* | 3/2018 | Krishnamoorthy | G08G 5/0043 |
| 2018/0126871 A1* | 5/2018 | Martinotti | B60F 5/02 |
| 2019/0316924 A1* | 10/2019 | Morgan-Brown | |
| | | | G01C 21/3676 |
| 2019/0383052 A1* | 12/2019 | Blake | B60L 53/12 |

\* cited by examiner

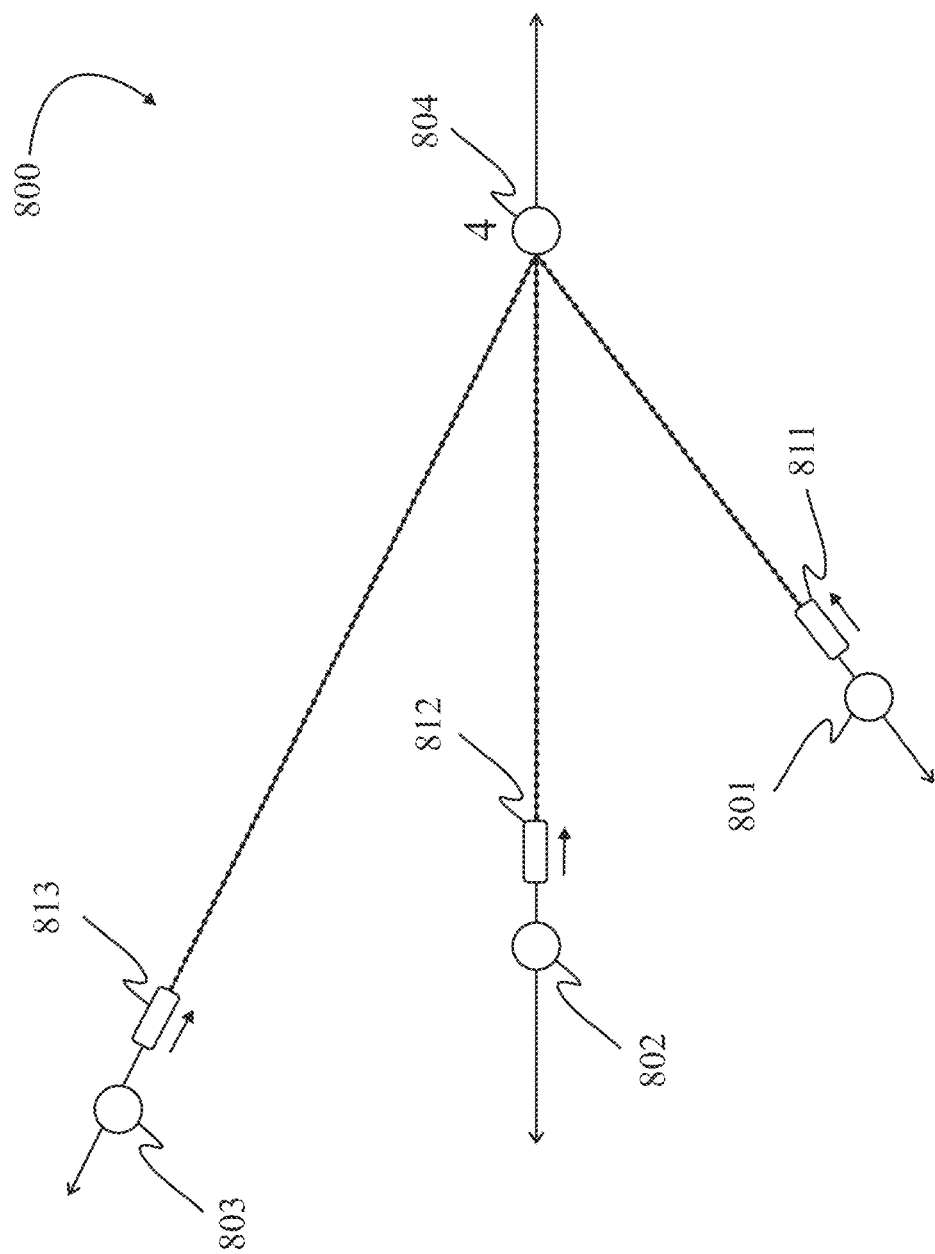

VEHICLE TRAFFIC AND CHARGE MANAGEMENT SYSTEM USING AUTONOMOUS CLUSTER NETWORKS OF VEHICLE CHARGING STATIONS

CROSS-REFERENCE TO RELATED DOCUMENTS

The present application claims priority to U.S. Provisional Application (PPA) Ser. No. 62/785,088, filed Dec. 26, 2018. All disclosure of the parent application is incorporated herein at least by reference.

BACKGROUND OF THE INVENTION

1. Field of the Invention

The present invention is in the field of electric vehicle management and pertains more particularly to managing passenger drones traveling between and stopping to charge at individual ones of charging stations managed in a cluster network of stations.

2. Discussion of the State of the Art

Passenger drones in the coming years will slowly replace cars and small trucks, and will be able to carry one passenger, or multiple, or goods. They will be autonomous, although under the control of networks, not humans. Most drones will be battery driven because battery technology is becoming cost competitive and improving rapidly, enabling batteries to store more energy while decreasing in size and weight. All drones will need to be recharged or refueled on longer journeys.

Besides battery technology, other new technologies exist today to make passenger drones quite feasible: Examples are Internet of Things (IoT) to enable communication between a wide range of electronic devices; collision avoidance including using video recognition; highly intelligent electronics that are also lightweight, cheap and small; advanced radio communications, such as the latest WiFi specifications and upcoming 5G variants; and new flying technologies and materials that are lightweight and strong. Also the demand is now here for two major reasons. Firstly, three-dimensional, above ground transport avoids rush hour traffic jams, where commuters all over the world get stuck every morning and evening wasting valuable time on a 2-dimensional surface. Second, for environmental reasons, because batteries plus electric motors eliminate the need for fossil fuels and are now cost competitive.

Where multiple drones of varying assignment of routes and dedicated purposes or missions must be accounted for on routes longer than a single drone battery charge may hold, charging stations may be placed along routes at differing levels of elevation using towers, poles, buildings, etc. for structural hosting purposes. One solid and repeatable utility is a grounded charging pole that may connect to varying types of vehicle charging systems using such as charging panels, charging cables, charging rods, charging rails and the like.

It is desired that charge timing per drone is very short so as not to interrupt travel for long periods or create drone traffic bottle necks because of charger unavailability or lack of charger location within a single charge flight distance of the drone. It is also desired that collision management and other parameters in drone operations are predicted for a traffic load of drones along a route or flight path.

What is clearly needed is a control system and apparatus for managing supercharging of aerial vehicles and controlling at least the flight paths for aerial vehicles along a flight path.

BRIEF SUMMARY OF THE INVENTION

According to an embodiment of the present invention, a control system and apparatus for managing charging of electric vehicles in a transportation infrastructure and controlling at least the flight paths for drone-assisted vehicles requiring periodic charge is provided including at least one computerized transportation system control node having network connectivity to and communications access over a first wide area network (WAN) supporting wireless communications, the first WAN covering a geographic region, a plurality of vehicle charging facilities distributed within the geographic region covered by the first WAN, and a computerized charge controller connected to each of the plurality of charging facilities for brokering electric power from a power source to at least one structurally supported charge transfer apparatus maintained at each of the charging facilities. The transportation system control node selects a number of the distributed vehicle charging facilities and assigns those charging facilities as a serial route cluster network of charging facilities for meeting charging requirements of the traveling vehicles during transportation from one place to another place within the region of the first WAN.

In one embodiment, the electric vehicles are passenger pods or parcel pods coupled to a drone array. In one embodiment, vehicle charging facilities include dedicated charging stations and multiple purpose facilities that include a vehicle charging facility. In one embodiment, the dedicated charging stations include at least one vertical charge pole with a charge controller and pole supported charge transfer apparatus. In one embodiment, the charge transfer apparatus includes at least one slider rail or at least one wireless pad oriented vertically. In one embodiment, the multiple purpose facilities are exchange stations, embarking stations, or debarking stations, with charging transfer apparatus supported on or within one or more buildings.

In one embodiment, the computerized charge controller includes a first ultra-capacitor for storing high charge current. In a variation of the embodiment, the charge controller loads power into the first ultra-capacitor from an underground power cable. In this embodiment, the charge controller directs discharge of the first ultra-capacitor to the charge transfer apparatus on demand. Also, in this embodiment, the electric vehicles include a second ultra-capacitor separated from the first ultra-capacitor during charging by the charge transfer apparatus and charge receiving apparatus provided on the vertical side of the electric vehicles.

In one embodiment, the charge transfer apparatus is a slider rail and the charge receiving apparatus is a set of electric contact brushes or shoes connected to the second ultra-capacitor the brushes or shoes making physical contact with the slider rail to take the transferred charge into the second ultra-capacitor from the first ultra-capacitor.

In another embodiment, the charge transfer apparatus is a vertically oriented wireless pad and the charge receiving apparatus is a magnetic coil receiver connected to the second ultra-capacitor. In the embodiment wherein the charge transfer apparatus is a slider rail, the second ultra-capacitor discharges current received from the first ultra-capacitor into the vehicle battery or batteries after the electric vehicle has disengaged from the slider rail. In the embodiment wherein the charge transfer apparatus is a vertically oriented wireless pad, the second ultra-capacitor discharges current received from the first ultra-capacitor into the vehicle battery or batteries after the electric vehicle has disengaged from the wireless pads.

In one embodiment, the electric vehicle syncs with the transportation system control node once a travel event is initiated to upload status. In a variation of this embodiment, the transportation system control node periodically contacts electric vehicles to determine status. In one embodiment, each charging facility charge controller communicates at least vehicle charge status and estimated time of arrival to the next charging facility to a next charging facility charge controller toward destination in the route cluster network. In a variation of this embodiment, the route cluster network of charging facilities report service data as it occurs to the transportation system control node.

In one embodiment, the transportation system control node periodically assesses route cluster network status for each active travel event. In one embodiment, the transportation control node receives information from an electric vehicle in an assigned route cluster network of an issue or otherwise detects an anomaly with current travel status of that electric vehicle and, after assessing the information, initiates one or more emergency procedures.

BRIEF DESCRIPTION OF THE SEVERAL VIEWS OF THE DRAWINGS

FIG. 8 is an illustration of an example case dealing with multiple approaching drones to a single station according to one embodiment of the present invention.

DETAILED DESCRIPTION OF THE INVENTION

Figure 1:
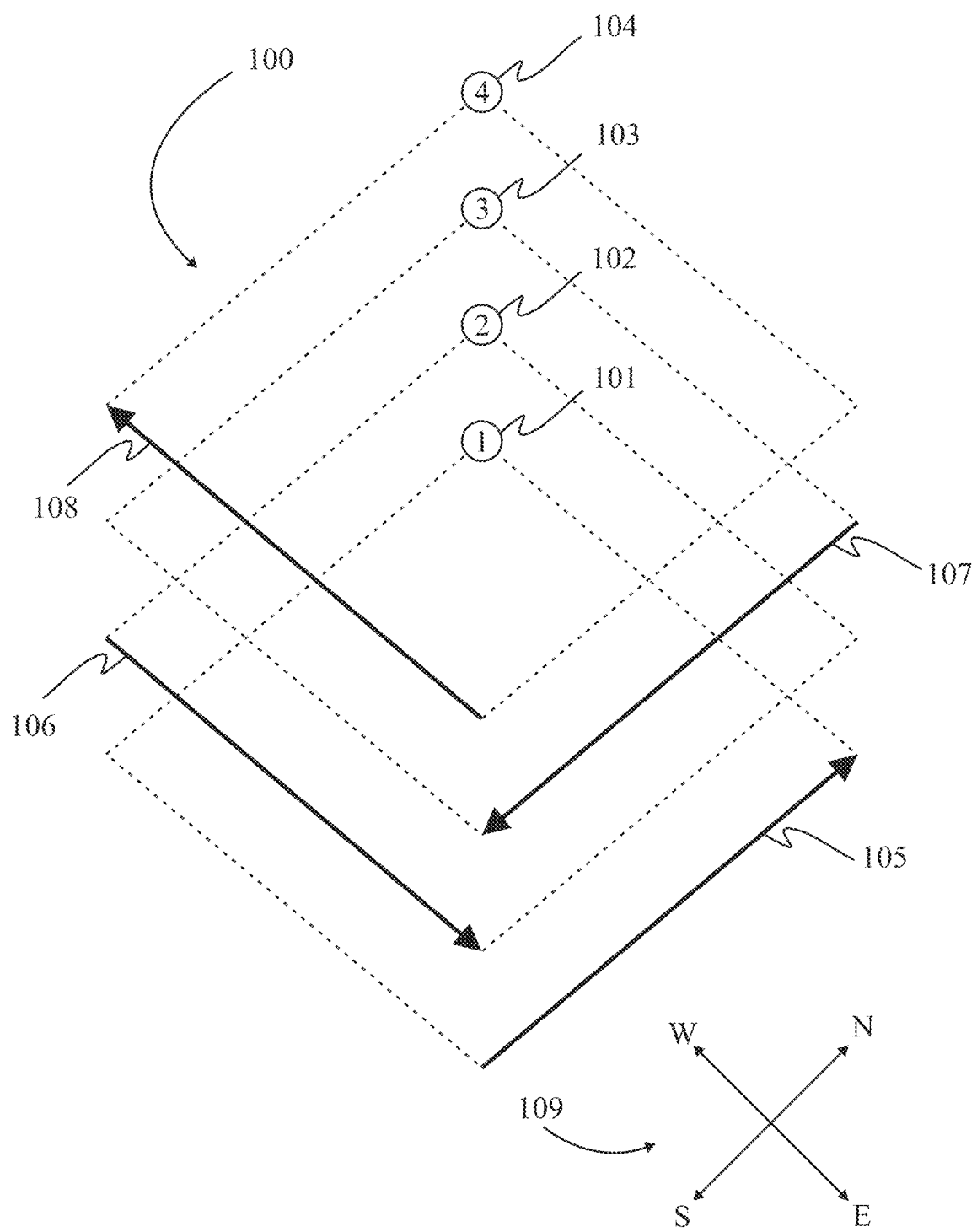
FIG. 1 is an illustration of a proposed droneway according to one embodiment of the present invention

FIG. 1 is an illustration of a proposed droneway 100 according to one embodiment of the present invention. For the system described herein, a droneway is a range of altitude designated for only drone travel. For example, an altitude of say 100 feet to 400 feet (30 m to 120 m) above ground level may be reserved in a droneway system with four or more levels. The droneway shown in FIG. 1 comprises four levels: A first level 101 is designated for drones traveling generally northward as indicated by arrow 105, a second level 102 is designated for drones traveling generally eastward as indicated by arrow 106, a third level 103 is designated for drones traveling generally southward as indicated by arrow 107, and a fourth level 104 is designated for drones traveling generally westward as indicated by arrow 108. The directions indicated in this embodiment are used just as an example and are not a set standard. Each level is specified at a different altitude, and the distance between levels may be adjusted depending of needs of the system. For example, a droneway that incorporates a level specifically for mass transit of freight, might have more head space to accommodate larger drones. It should be understood that the processes described in this application may be implemented even if this or another proposed droneway is not used. A compass 109 is provided for reference of relative directions of FIG. 1.

Figure 2:
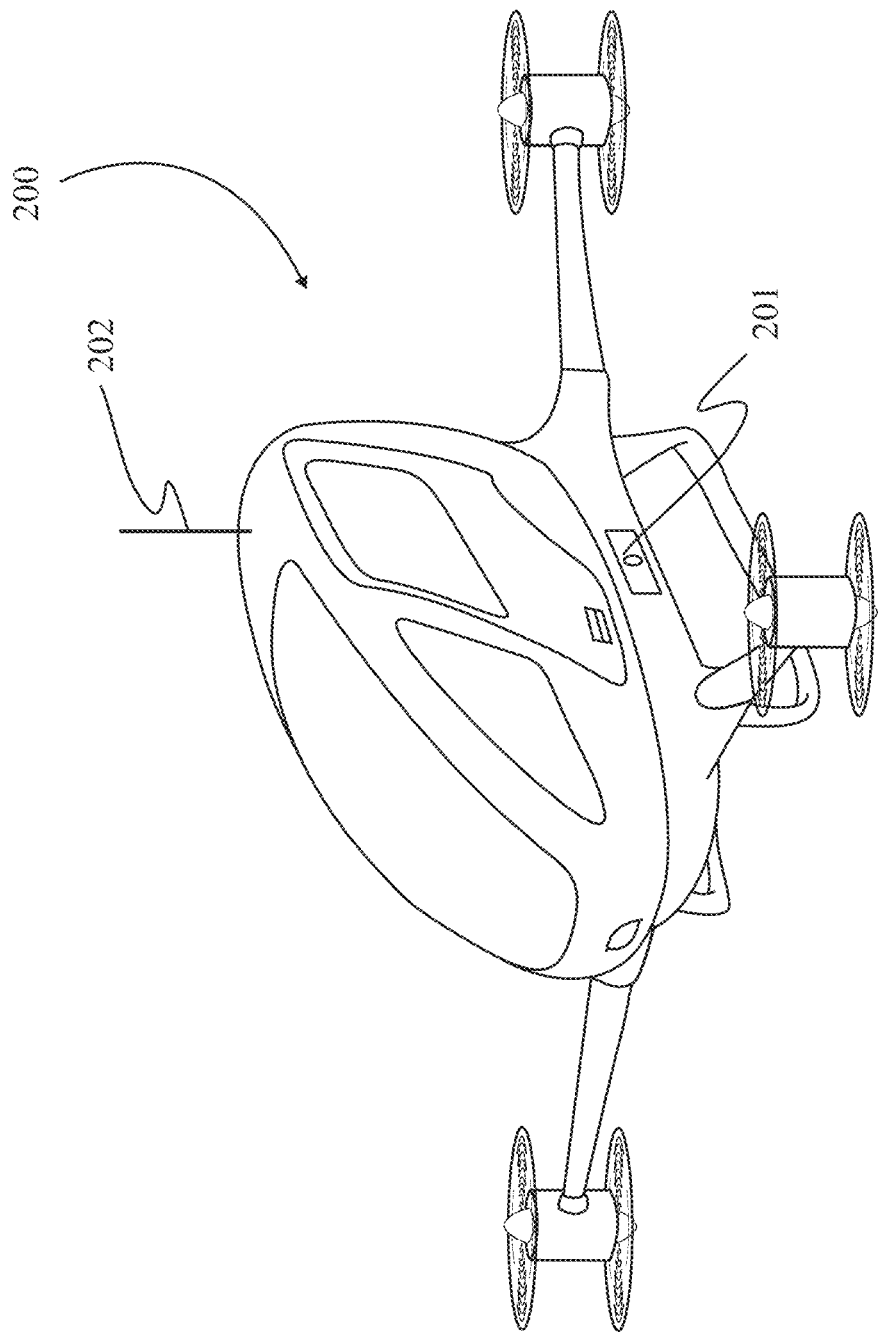
FIG. 2 is an illustration of an example drone adapted for usage in various embodiments of the present invention.

FIG. 2 is an illustration of an example drone 200 adapted to be used in various embodiments of the present invention. The drone used as an example here is modeled after a drone from EHANG, with model name EHANG184, which was unveiled at the Consumer Electronics Show in Las Vegas in 2016. Other notable features of the EHANG184 drone are its load capacity of 100 kilograms, a cruise time of 23 minutes on a full charge, and an average travel speed of about 100 kilometers per hour, with a range of about 40 km.

Drone 200 has a charging port 201 in an easily accessible place to receive a charging mechanism. Charging ports may be present on either or both sides for convenience and ease of access. Drone 200 may have an antenna 202, or some other means for facilitating wireless communication. It will be apparent to the skilled person that antenna 202 is exemplary, and that different communication systems may have different antennas. Drone 200 may also have an onboard computer not shown in the drawing to operate the systems of drone 200, and to handle such tasks as communications with charging systems, communications towers, and other drones using some standard communications protocol; handling course correction due to weather conditions; collision sensors to avoid obstacles and obstructions; and to receive and transmit localized and broad system emergency alerts.

Figure 3:
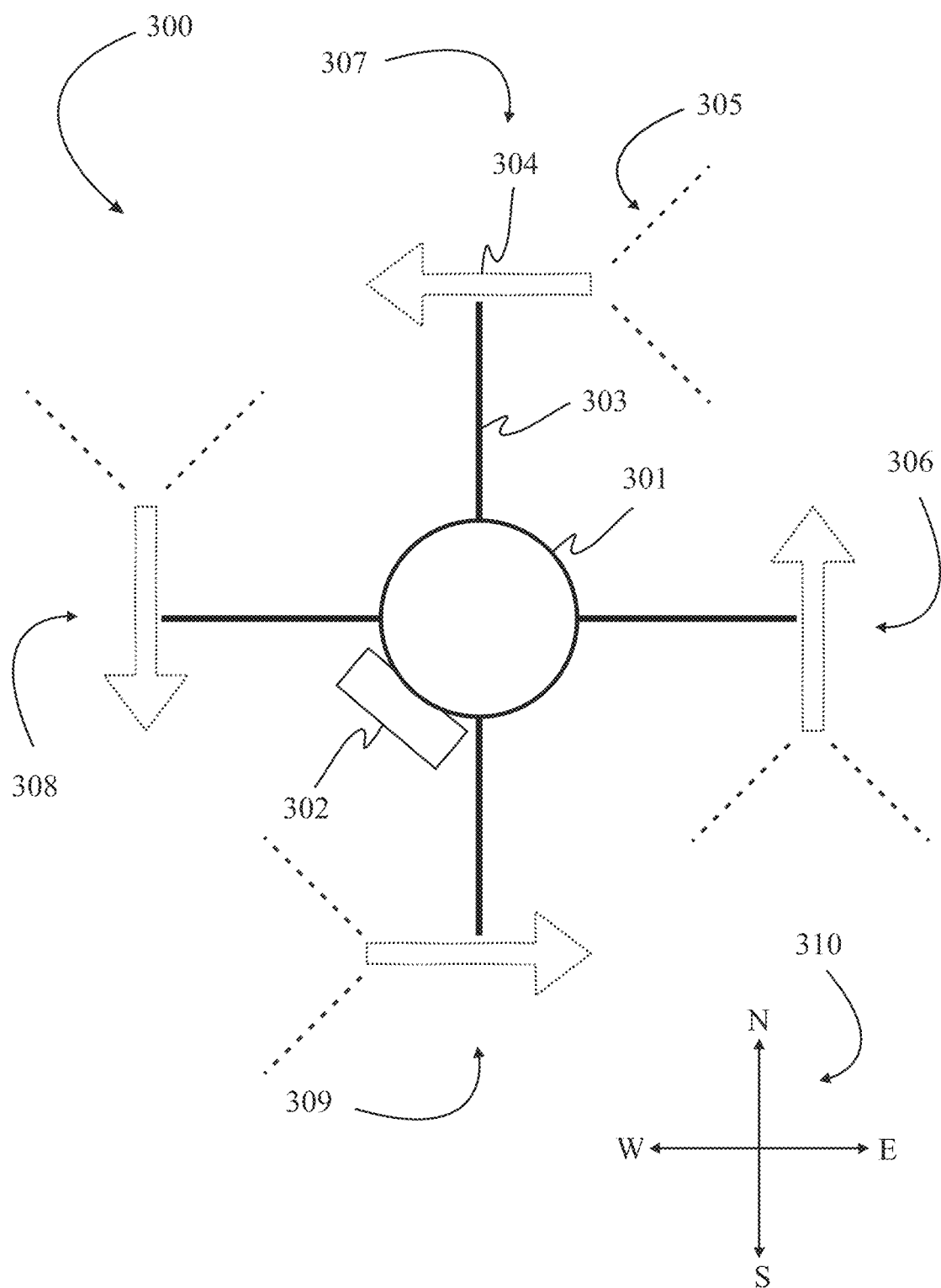
FIG. 3 is an illustration of an overhead view of a charging station according to various embodiments of the present invention.

FIG. 3 is an overhead illustration of a charging station system 300 in one embodiment of the invention. Charging station system 300 comprises a central pole 301, in which electronics and charging equipment may be present, and a controller 302. The pole may be either at ground level or mounted on the roof of a building, or may be implemented on some existing tower. The functions of controller 302 include, but are not limited to, communications with drones, communications with other charging stations, communications with a central computer, general communications, emergency alert systems, regulation of charging power depending on needs of presently charging drones, and collection of localized weather data.

Charging station system 300 in this embodiment uses four charge locations: a charging location 306 for north traveling drones, a charging location 307 for westward traveling drones, a charging location 308 for southward traveling drones, and a charging location 309 for eastward traveling drones. Each of charging locations 306, 307, 308, and 309 resides at different altitudes, similar to the layout of proposed droneway 100 in FIG. 1. It should be understood that any number of charging locations may be safely implemented, with the amount of space, and power provided from a power grid being an important limitation.

The altitude of charging locations in station system 300 is not meant to suggest that drones serviced by the station will necessarily travel from station to station at the same altitude as the charging locations, which are located on a station system supported at ground level, or some other hard surface. Drones may very well be controlled to fly at a different altitude, and to change altitude approaching and leaving a charging station.

Each charging location 306, 307, 308, and 309 in this example comprises a charging mechanism 303, a charging zone 304, and a pre-designated entry zone 305. Various embodiments of charging mechanism 303 are described below in enabling detail in FIGS. 4A to 6B. In some embodiments, it is possible to use a combination of different charging mechanisms for each charge location. The charging zone 304 is defined as an area in which a drone may be connected to a charging mechanism 303, and may receive a charge.

In this embodiment, the charging zone is ±45 degrees from the direction of arrow 304. In this example, active charging zone 304 is denoted by an illustration of an arrow indicating the path in which a charging drone may travel. Pre-designated entry zone 305 is an area in which incoming drones are received by any specific charging areas. In this embodiment, the entry zone is approximately ±45 degrees from the entry of each active charging area. Referential compass 310 is provided for positional reference according to this embodiment but may in fact be in any direction.

Figure 4A:
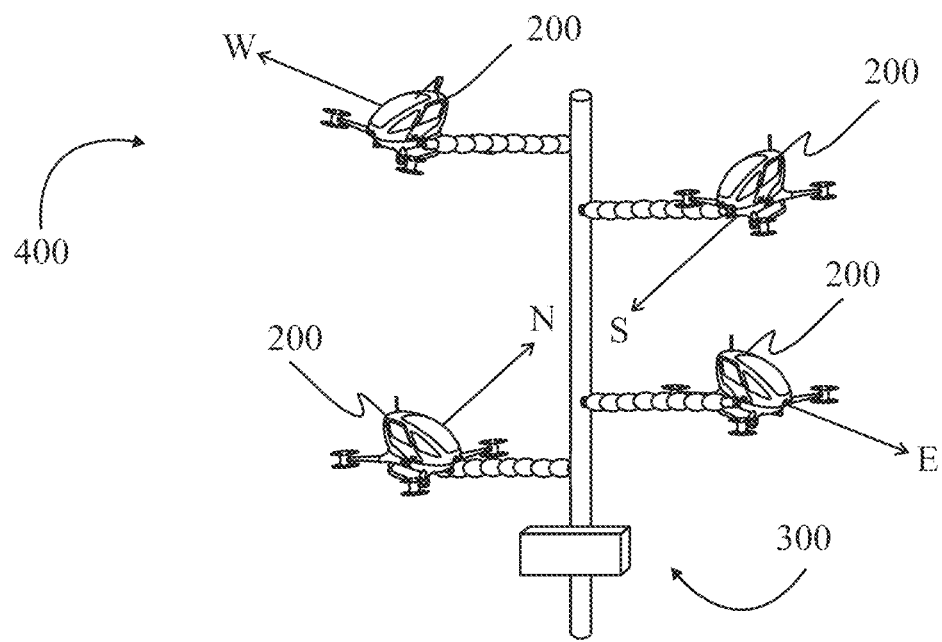
FIG. 4A is an illustration of a cable charging implementation according to one embodiment of the present invention.
Figure 4B:
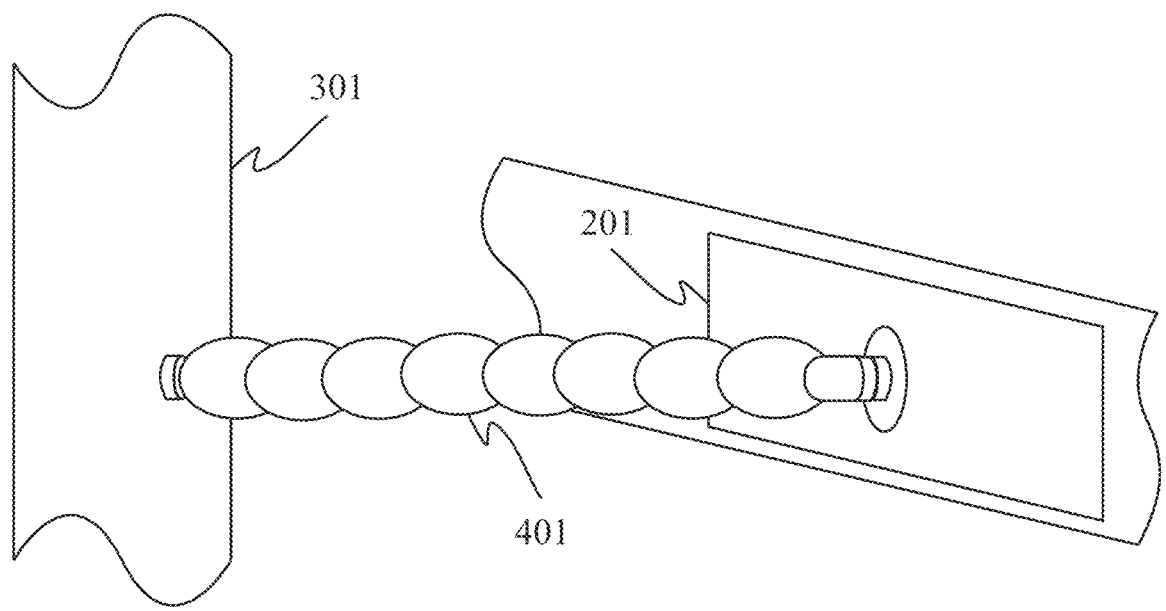
FIG. 4B is an expanded view of a single cable charging mechanism connecting to a drone's charging port according to one embodiment of the present invention.

FIG. 4A is an illustration of an articulated cable charging system 400, and FIG. 4B is an expanded view of a single connection in the articulated cable charging system according to one embodiment of the present invention. In this embodiment, drones 200 are connected to the articulated cable charging station system 400 via a computer controlled, mechanically articulated cable. The articulated cable is made up of a plurality of segments that are connected by joints to adjacent segments. A primary conductor within the cable must be able to carry sufficient current for charging and will be on the order of 1 cm in diameter, if in fact a single cable.

In some embodiments the primary conductor may be a woven, multi-strand element capable of articulation in the area of the joints of the articulated cable. Each joint connection may contain a means to provide movement with the use of computerized instructions, such as small motors. This provides the plug at the end of the articulated cable with a degree of movement and enables it to accomplish tasks such as automatic plugging, automatic unplugging, and automatic positioning.

As a drone 200 reaches a charging zone entry, articulated cable 401 is expected to be on standby, and automatically moves to and connects with a charging port 201 of drone 200. The articulated cable may be able to find charging port 201 through the use of sensors, such as through video recognition or with use of laser beams or magnetic attraction or some other means of accurate alignment in both the horizontal and vertical axes. If the drone battery becomes fully charged, or as drone 200 reaches the charging zone exit, the charging current is switched off and then articulated cable 401 disconnects automatically, and quickly returns to the charging zone entry, and is on standby for a next incoming drone to charge.

In some embodiments it is not necessary that the drone be moving through the charging zone at all times, and drones may hover for a time to receive a charge. In the case of the articulated cable, as shown in FIG. 4B, the cable may be provided with a certain amount of slack to be able to handle effects of wind.

Figure 5A:
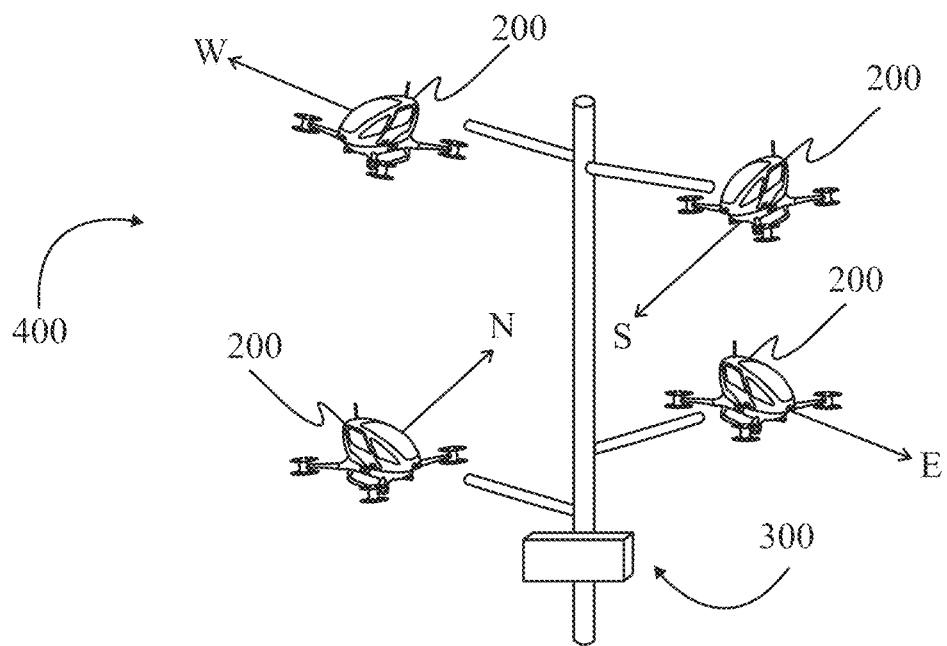
FIG. 5A is an illustration of a wireless charging implementation according to one embodiment of the present invention.
Figure 5B:
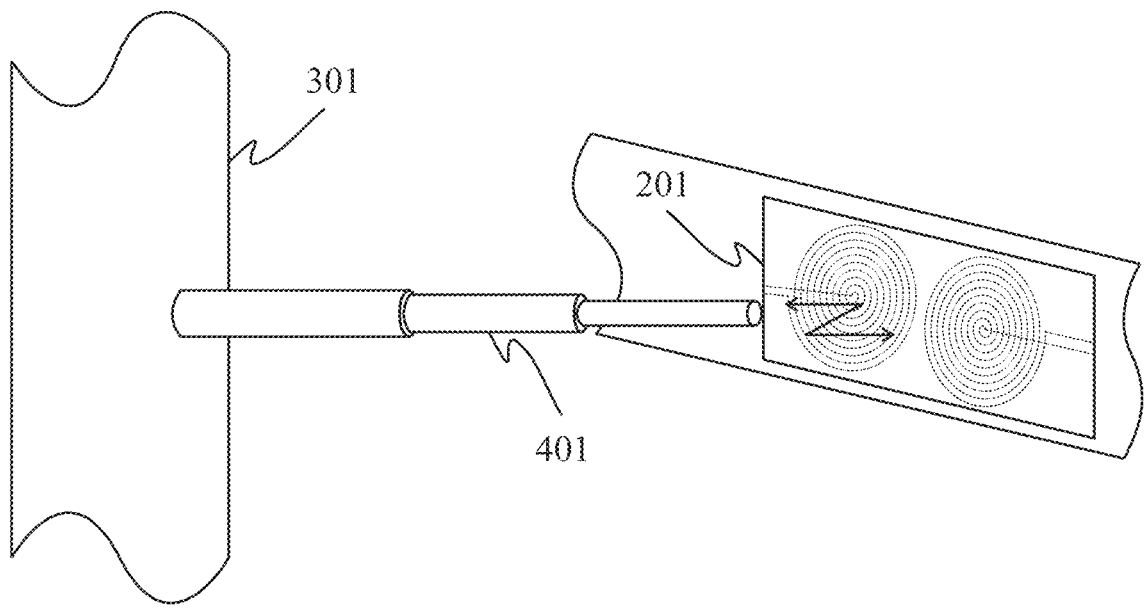
FIG. 5B is an expanded view of a single wireless charger wirelessly charging a drone according to one embodiment of the present invention.

FIG. 5A is an illustration of a wireless charging station system 500, and FIG. 5B is an expanded view of a single connection from wireless charging station system 500 according to one embodiment of the present invention.

Generally, wireless charging exhibits higher power efficiency by reducing distance between a wireless power transmitter and a wireless power receiver. In this embodiment, wireless charging station system 500 uses a mechanically movable and extendable rod 501 embedded with wireless charging hardware as the wireless power provider to reach a charging port 201 of a drone 200 adapted to receive power wirelessly from extendable rod 501. Charging port 201 may have a large area where it may receive a charge wirelessly from extendable rod 501 to account for unintended movement caused by external influences, such as strong winds.

As drone 200 approaches a charging zone of wireless charging station system 500, and positions at a correct altitude, rod 501 may move laterally to line up with charging port 201 to achieve the most efficient charge rate possible in that particular instance, and the extendable rod 501 extends to close the distance between the extendable rod 501 and charging port 201, but may not make physical contact.

As drone 200 cruises through the charging zone at a pre-determined speed, charging rod 501 retracts as needed to the half-way point and then extends after the half way point to provide a charge wirelessly for the entire duration while drone 200 is in the charging zone. Once drone 200 reaches the charging zone exit, the charging power is switched off and charging rod 501 retracts away from drone 200, and positions back to the charging zone entry. At this point, charging rod 501 is on standby, ready to engage a next incoming drone. And in some embodiments a drone may stop and hover for a time, and the charging rod may stop moving as well for that time.

Figure 6A:
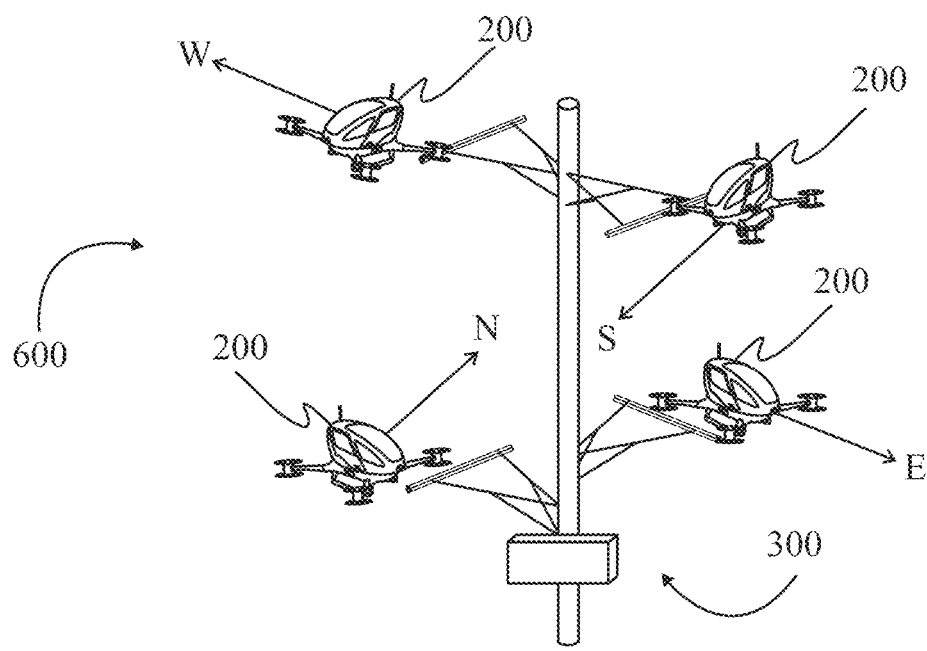
FIG. 6A is an illustration of a charging rail implementation according to one embodiment of the present invention.
Figure 6B:
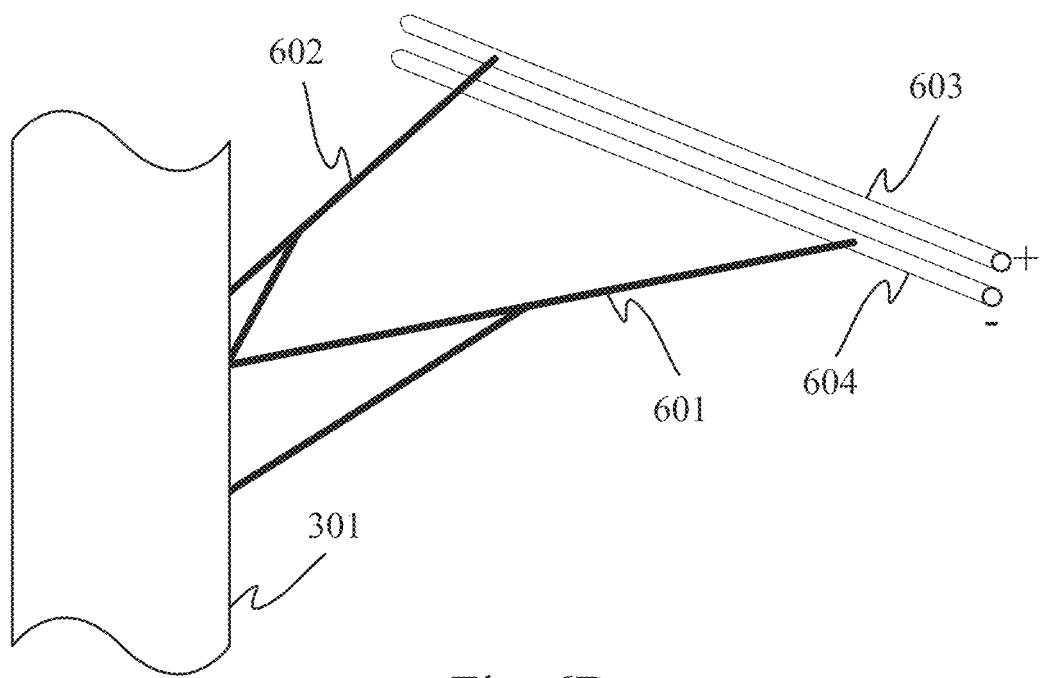
FIG. 6B is an expanded view of a single charging rail according to one embodiment of the present invention.

FIG. 6A is an illustration of a fixed-rail charging station system 600, and FIG. 6B is an expanded view of a single rail connection from fixed-rail charging station system 600 according to one embodiment of the present invention. In this embodiment fixed-rail charging station system 600 is equipped with a positive rail 603 and a negative rail 604.

Each of rails 603 and 604 are held out away from, and generally perpendicular to charging pole 301 by brackets 601 and 602. Brackets 601 and 602 may hold rails 603 and 604 at a distance from charging pole 301 to make them easily accessible to an engaged drone 200.

Brackets 601 and 602 also serve a purpose of connecting rails 603 and 604 to a power grid, each bracket connecting exclusively with its own rail in any given set in this embodiment of the present invention. In order to receive a charge from the fixed rail charging station system, engaged drone 200 may have a charging receiver with fixtures that makes contact with rails 603 and 604, such as brushes, as the drone cruises through a charging zone at a pre-determined speed until the end of the rails 603 and 604 is reached.

Drones in some embodiments may not continue to move along the length of charging rails, but may, in some cases, be motionless, or even reverse direction along the charging rails. It is necessary that the reception interface of the drone be in contact with the charging rails while charging takes place.

In addition to elevated charging station system descriptions above, the charging mechanisms shown herein may also be used in a ground docking embodiment. In this embodiment of the present invention, there may be present an open lot, similar to a parking lot used for cars, where a drone may dock to receive a charge using a charging mechanism such as those illustrated in FIGS. 4A to 6B. A multi-level structure, similar to a parking garage, may also be used to implement this embodiment of the present invention.

As a drone approaches a ground docking lot, the drone may engage with a computer system managing the docking lot. The docking lot may have sensors present that may be able to report to the computer system information which may include spaces which are vacant for charging, or any emergency incidences that any incoming drone may need to avoid. The drone may report to the computer system its charging needs, such as charging port type, current battery levels, and expected amount of time the drone may be docked. The computer may report to the drone such information as currently open spaces that meet the drone's criteria, and any special flying directions to reach a particular open space. After which, a confirmation may take place between the two and the drone may fly to a designated docking space to charge.

The series of FIG. 7 is a set of illustrations corresponding to snapshots of various stages in the process of approaching and receiving a charge from a charging station system. It should be understood that these figures are illustrated as examples, and only one connection will be shown. This is not indicative of any limitation to the present invention.

FIGS. 7A through 7F illustrate steps in which an incoming drone 200 approaches an entry zone 305 of a charging station system 700 for charging. Charging station system 700 comprises a charging pole 301, a controller 302, a charging mechanism 303, and a charging zone 304. In this illustration, drone 200 is wirelessly communicating with the charging station system 700, and has received a go signal from charging station system 700 to approach for a charge, along with a charging speed determined by calculations done by controller 302 in order for drone 200 to receive an adequate charge to guarantee safe travel to a next destination. This process is expanded upon in description of FIG. 9 below.

Figure 7A:
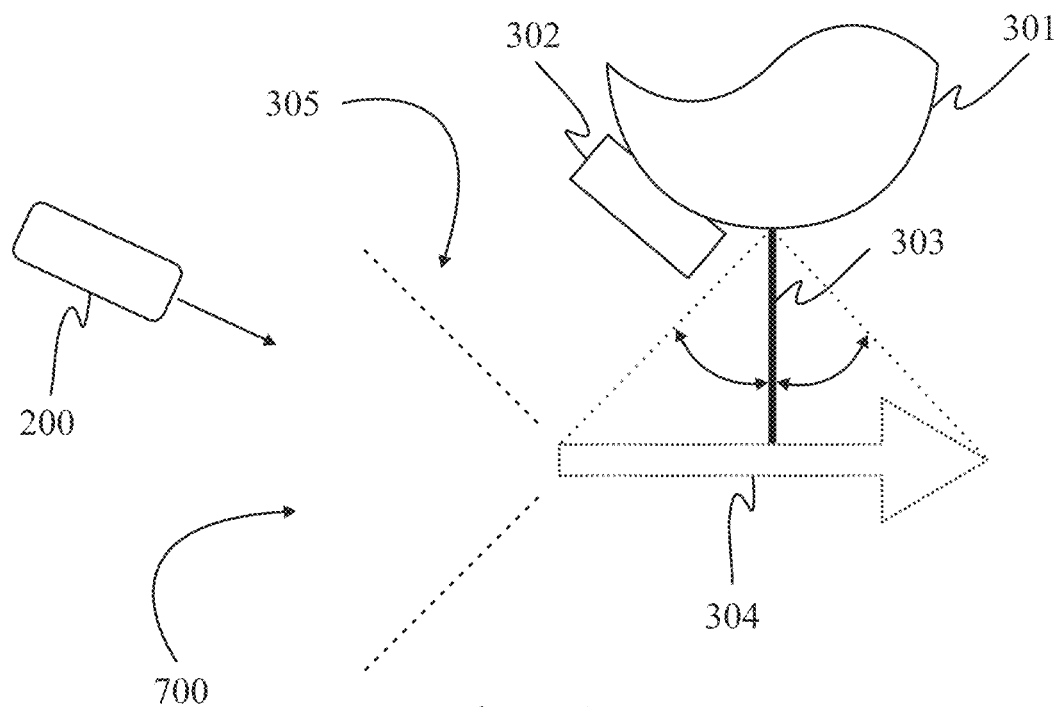
FIG. 7A is an illustration of a drone entering a predesignated charging zone according to one embodiment of the present invention
Figure 7B:
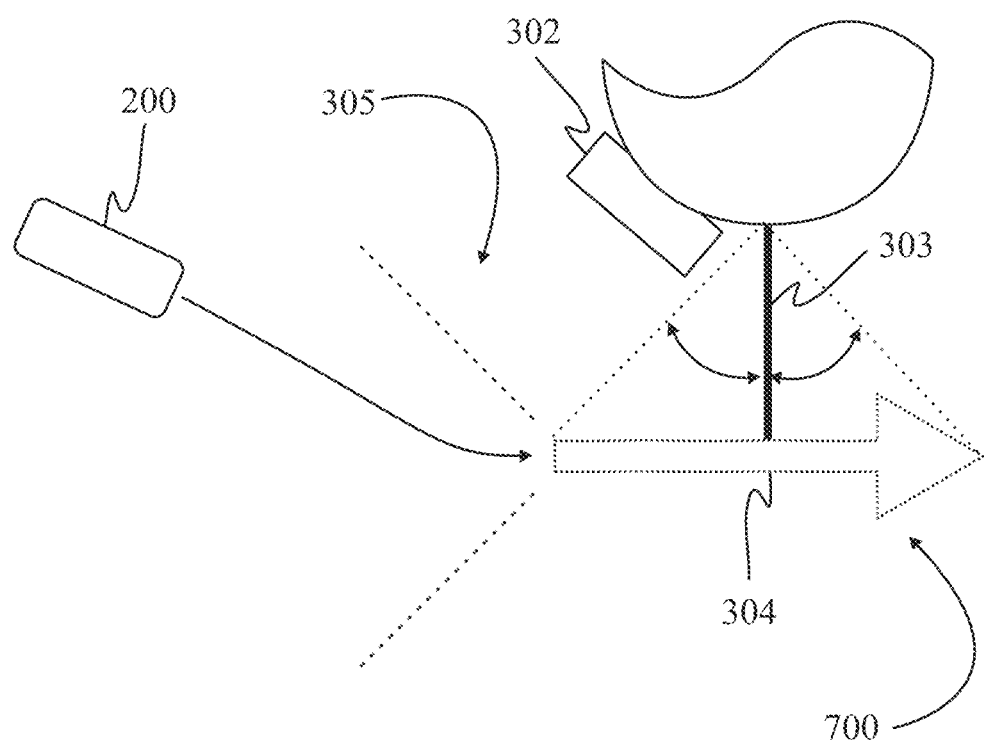
FIG. 7B is an illustration of a drone course-correcting to attain the correct orientation to receive a charge from the charging station according to one embodiment of the present invention.

FIG. 7B illustrates a step in which a drone 200 decelerates to attain the pre-determined charging speed. As drone 200 travels through entry zone 305, and before it reaches a charging zone 304 entry, the drone 200 adjusts its orientation and altitude to interact with charging mechanism 303 with consideration for weather conditions around charging station system 700, which may be reported to drone 200 through wireless communications. Note that the wind has much more of an effect at the reduced speed of the drone while charging at the station. The drone's direction will need to change to maintain traveling in the direction of the arrow. The worst case would be when the wind is the same speed as the drone speed and is perpendicular to the arrow. In this case the drone needs to rotate direction up to 45 deg to the arrow to maintain the direction of the arrow. This means that the drone's receptacle must be capable of engaging the charging entity over a range of +/−90 deg relative to the drone.

Figure 7C:
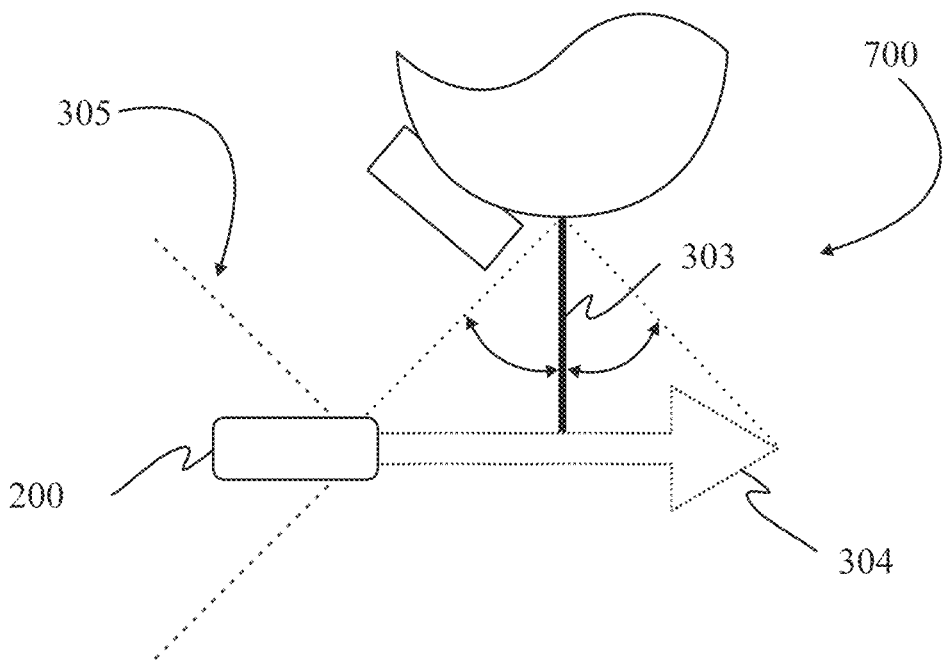
FIG. 7C is an illustration of a drone positioned with the correct orientation at the entry point of the charging station's charge zone according to one embodiment of the present invention.

FIG. 7C illustrates a step in which drone 200 has reached the charging zone 304 entry, and aligned and connecting with charging mechanism 303. At this step, drone 200 has slowed down to the pre-determined charging speed, charging power is applied to the drone, and then the drone proceeds to cruise through charging zone 304 while connected to charging mechanism 303. Mechanism 303 rotates and retracts relative to the supporting pole as the drone passes through the charging zone, as shown.

Figure 7D:
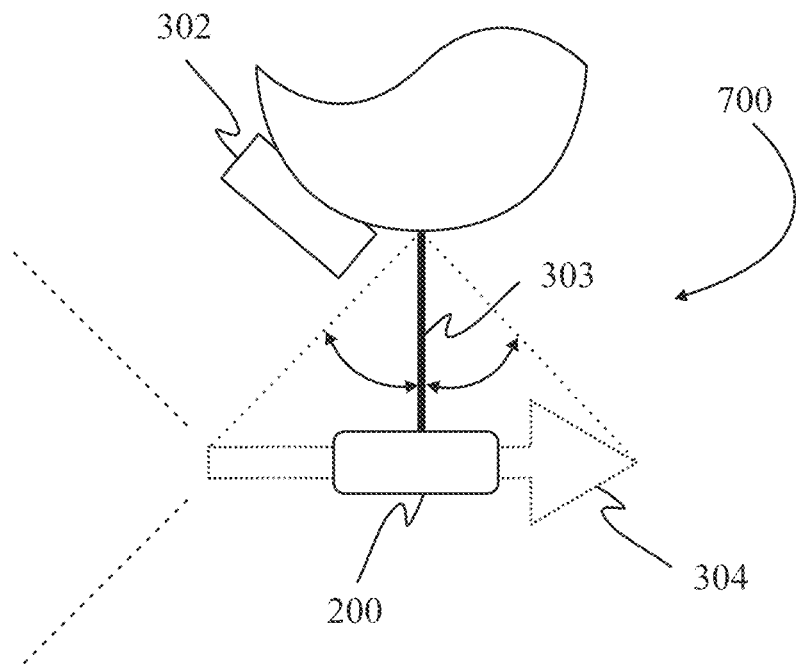
FIG. 7D is an illustration of a drone in the process of receiving a charge according to one embodiment of the present invention.

FIG. 7D illustrates a step in which drone 200 has reached a midpoint of charging zone 304. Drone 200 continues to cruise through charging zone 304 all the while battery levels are constantly checked and reported between drone 200 and controller 302. If the battery is reported as fully charged, the charging system may stop charging at any point in the process, and drone 200 continues on to the charging zone 304 exit, where charging power is removed, if not done so already.

Figure 7E:
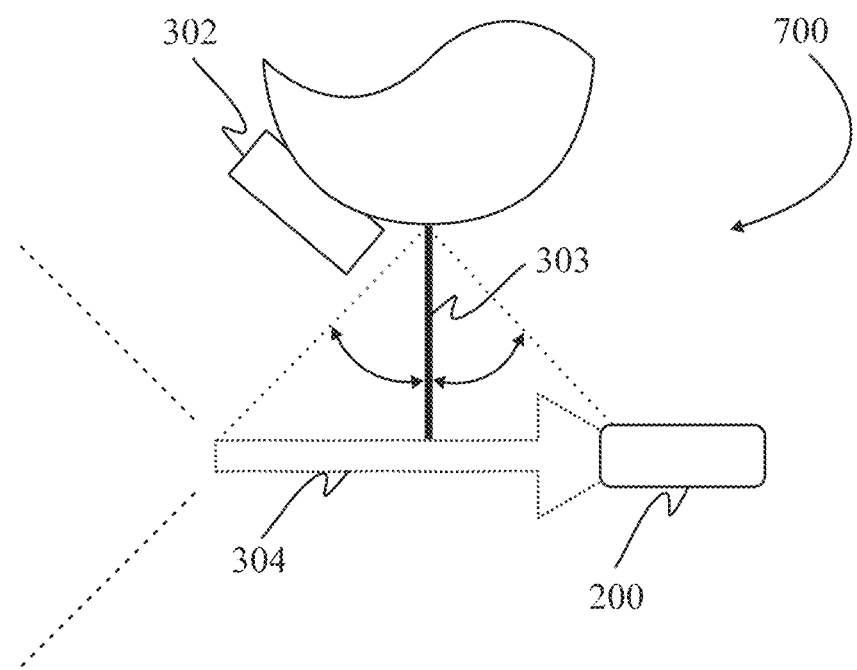
FIG. 7E is an illustration of a drone reaching an exit point of the charge zone according to one embodiment of the present invention.

FIG. 7E illustrates a step in which drone 200 reaches the charging zone 304 exit. At this point, drone 200 disconnects from charging mechanism 303 as necessary, and performs safety checks, and reports whether the charge performed provided enough energy for drone 200 to safely reach a next destination. Once all systems are confirmed to be correct, and safe to proceed, charging station system 700 may report to a next charging station system to expect drone 200, perhaps in a particular time window.

Figure 7F:
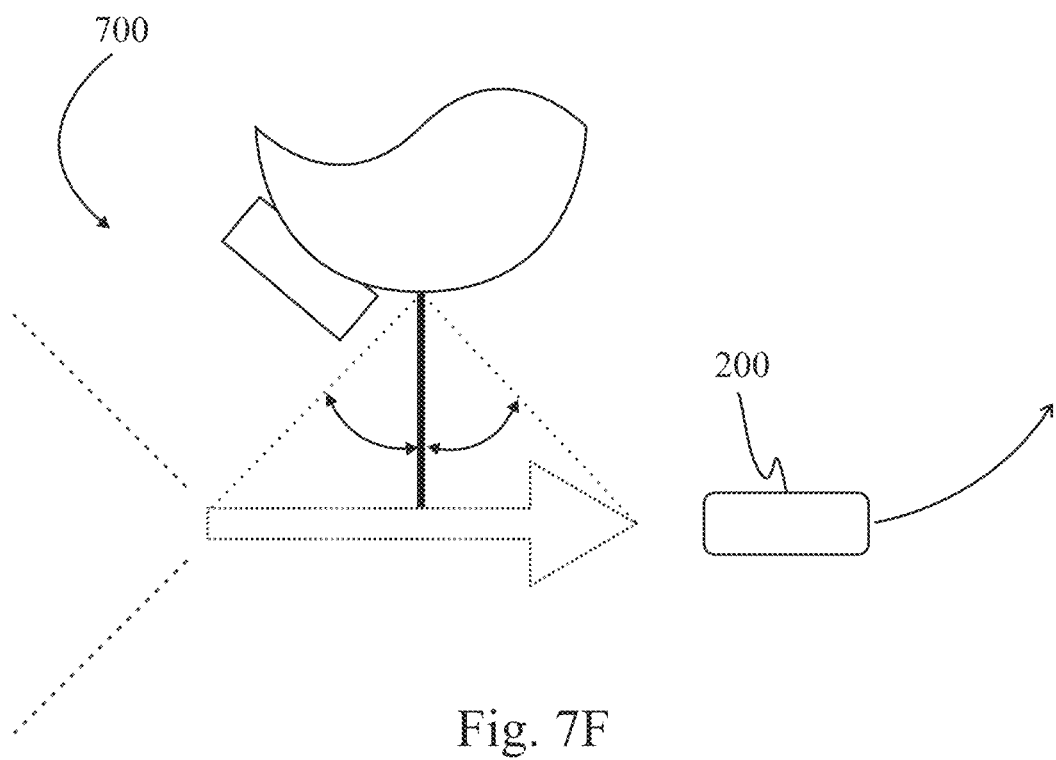
FIG. 7F is an illustration of a drone departing from a charging station, and moving onto a next charging station while en-route to its destination according to one embodiment of the present invention.

FIG. 7F illustrates a step in which drone 200 departs from charging station system 700. This may occur after charging station system 700 has received an acceptance confirmation from a next charging station system, that has added drone 200 to a queue of incoming drones for the next station. An alternative scenario may be that drone 200 has enough power in its reserves to reach a final destination and may not need to stop by another charging station system. Drone 200 returns to a correct altitude, direction and velocity and continues on its journey.

FIG. 8 is an illustration of a queuing system 800 in which a destination charging station system 804 interacts with a plurality of incoming drones: a first drone 811, a second drone 812, and a third drone 813. Each of charging station systems 801, 802, 803, and 804 are explained in further detail in description of FIG. 3 above. The system of the present invention is capable of handling many more drones, but three is used in this instance as an example.

At this particular moment, first drone 811 has departed from a first charging station system 801, second drone 812 has departed from a second charging station system 802, and third drone 813 has departed from a third charging station system 803. Before each of the drones 811, 812 and 813 departs from their respective charging station systems, they each receive a pre-calculated travel velocity from the respective charging station systems, as well as being added to a queue kept by next destination charging station system 804.

The travel velocity may be different for each drone, depending on a variety of determinants, such as weather conditions and their distance from the destination charging station system 804, to allow each of the drones 811, 812, and 813 to travel at their respective velocities as constantly as possible, and reach destination charging station system 804 just as the immediately preceding drone completes its charging cycle and a charging mechanism of destination charging station system 804 is ready to begin charging a next drone.

An important purpose of queueing system 800 is to keep a smooth flow of incoming drones without a need to keep drones hovering around any particular charging station system for too long. Hovering may also create hazardous conditions if too many drones are hovering and waiting for their turn to charge before departing. However, if a situation arises in which a drone arrives earlier or later than expected, such as in the case of unexpected winds or drone malfunction, change in queueing and hovering may take place on-the-fly without complete system failure. Communications between the charging station systems and drones may adjust travel velocity between charging station systems to account for any unexpected turn of events, to allow the system to normalize.

Figure 9:
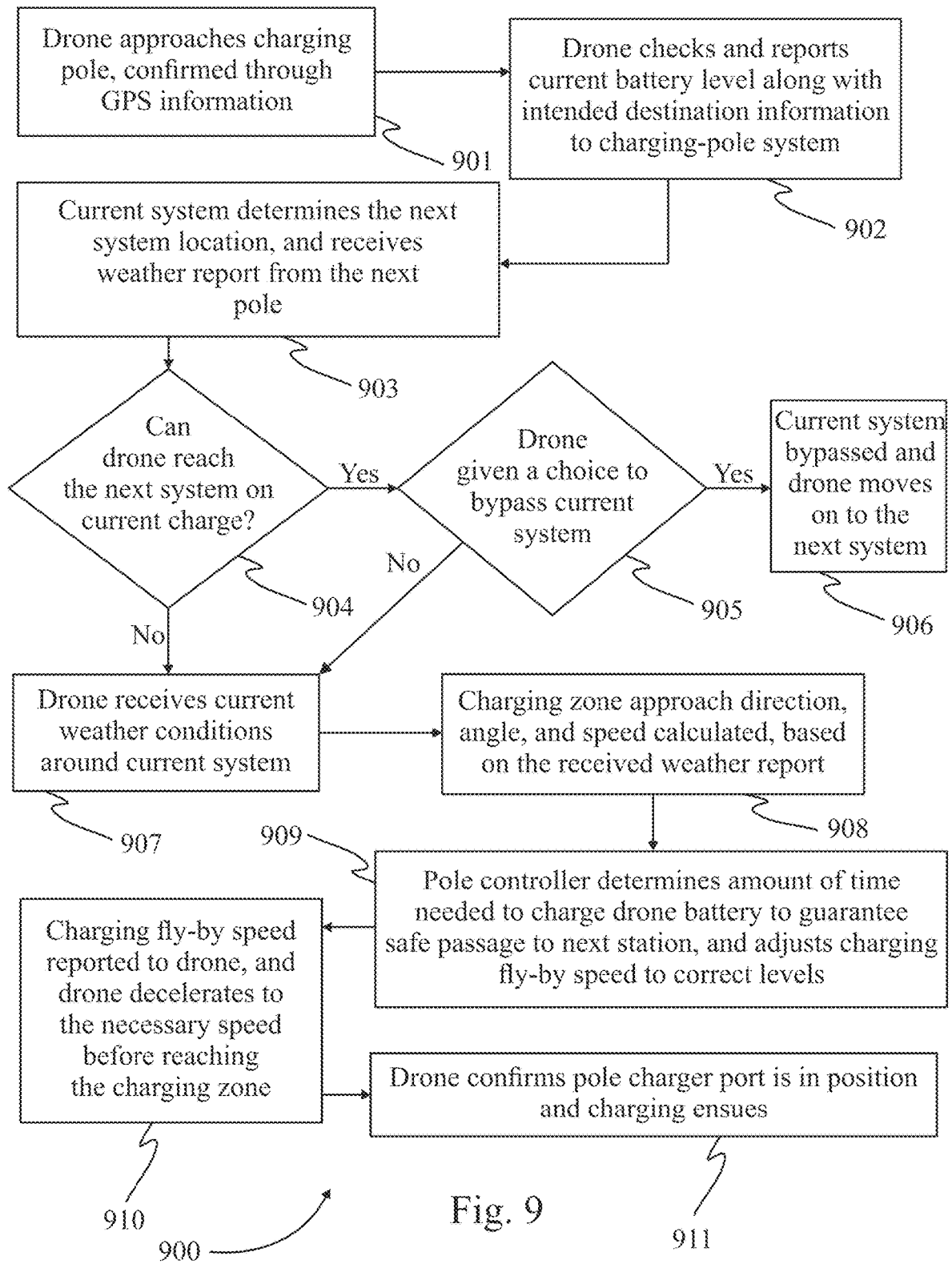
FIG. 9 is a flowchart of an example procedure for drone approach to a charging station according to one embodiment of the present invention.

FIG. 9 is a flow chart 900 showing steps for a drone approach in an embodiment of the invention. At step 901 a drone approaches a charging station system, but is still a fair distance from entering a charging zone of the charging station system. The arrival of the drone may be determined in a variety of ways, such as by a global positioning system or by a radio triangulation system and/or by other means. At step 902, the drone reports its energy levels to the charging station system, along with the drone's intended destination.

At step 903, a controller of the charging station system determines a next charging station system along the drone's route to reach its intended destination. In conjunction with weather reports around the current and next charging station, and battery levels, the controller may determine whether the drone is able to reach the next charging station system without needing a charge.

At step 904, if the drone can reach the next charging station system, step 905 is reached, and a passenger in the drone, or intelligence in the drone, is provided an option of charging at the present charging station system or bypassing the present charging station system. If the decision is to bypass the present charging station system, step 906 is reached and the drone receives information regarding the next charging station system and bypasses the present charging station system. The information regarding the next charging station system may include, but is not limited to, positional information, weather information, and a speed in which to travel to reach the next charging station system at an optimum time.

Returning to step 904, if the drone cannot reach the next charging station system, or in step 905 the decision is to receive a charge at the present charging station system, step 907 is reached. The present charging station system may communicate a report to the drone to convey information such as weather conditions or any emergency situations surrounding the present charging station system. At step 908, a charging zone approach speed and direction is determined based at least in part by the weather report received.

At step 909, specific needs for charging the drone are determined based on the drone's current battery level as well as the weather conditions, which may include amount of time needed to charge, and a charging velocity to maintain while receiving a charge to ensure an adequate charge is received. At step 910 the charging speed is reported to the drone, and the drone decelerates to the necessary speed and descends before reaching the charging zone. At step 911, the drone confirms a charging mechanism of the present charging station system is engaged. Once the charging mechanism engages with the drone, charging begins, which is detailed in FIG. 10.

Figure 10:
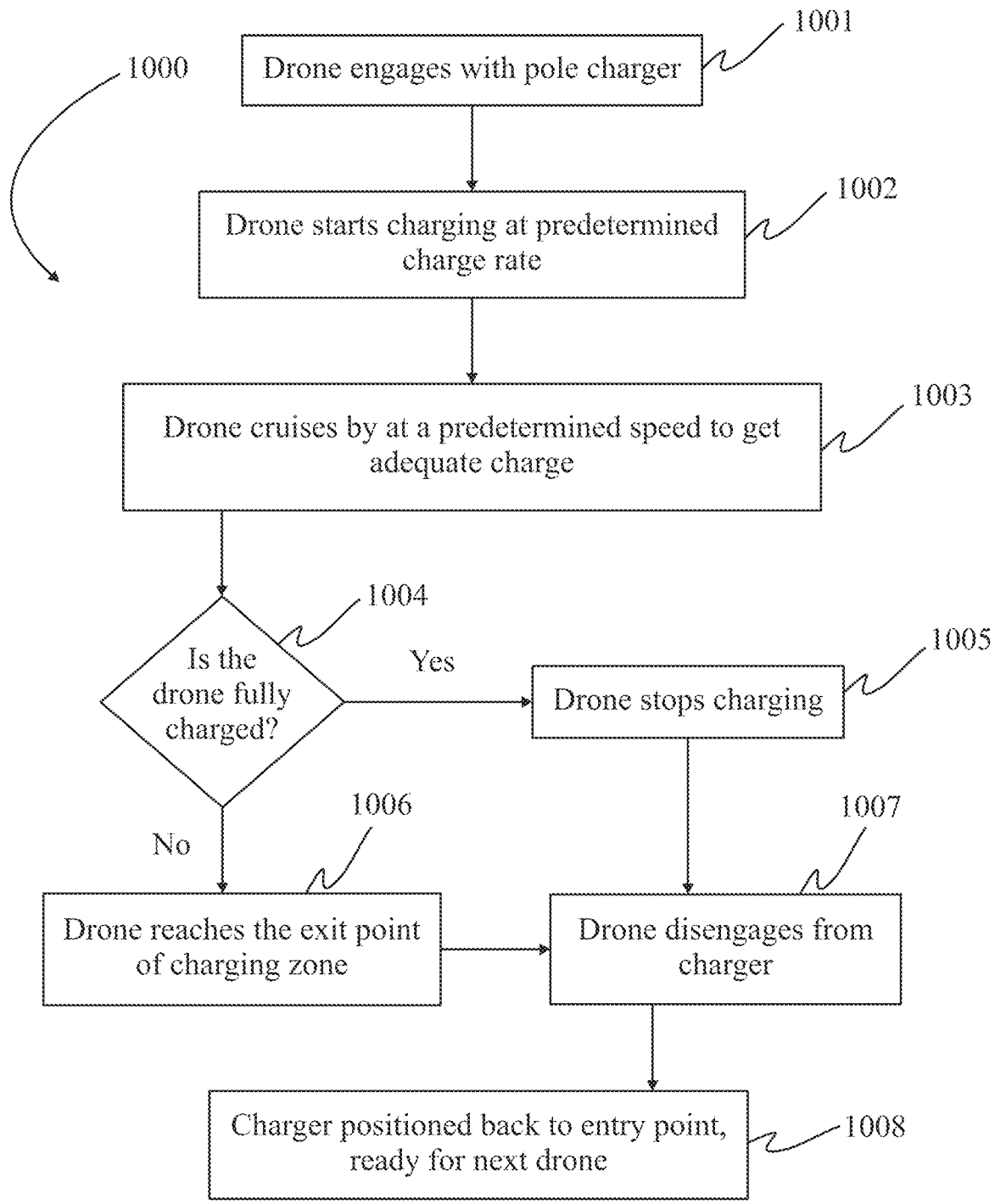
FIG. 10 is a flowchart of an example procedure during the charging process according to one embodiment of the present invention.

FIG. 10 shows a flowchart 1000 of what may occur during charging. At step 1001, which may follow immediately after step 911, a drone connects to a charging mechanism of a charging station system. At step 902, the charging station system provides a charge at a controlled rate that was predetermined during the approach stage described with reference to FIG. 9. At step 1003, the drone cruises through a charging zone of the charging station system at a predetermined charging speed, while receiving a charge from the charging station system.

During charging, charge capacity and state is checked at step 1004. In the case that the drone becomes fully charged, step 1005 is reached. At step 1005, the drone stops charging, and the charging mechanism may disconnect while the drone continues to cruise towards the charging zone exit and step 1007 follows. Returning to step 1004, if the drone doesn't reach max battery charge for the entire duration while in the charging zone, step 1006 is reached. At step 1006, the drone reaches the exit, finishing its charging cycle and step 1007 follows. At step 1007, the drone disengages with the charging station system. At step 1008, the charging mechanism is positioned back to the charging zone entry, and ready to receive a next drone for charging.

Figure 11:
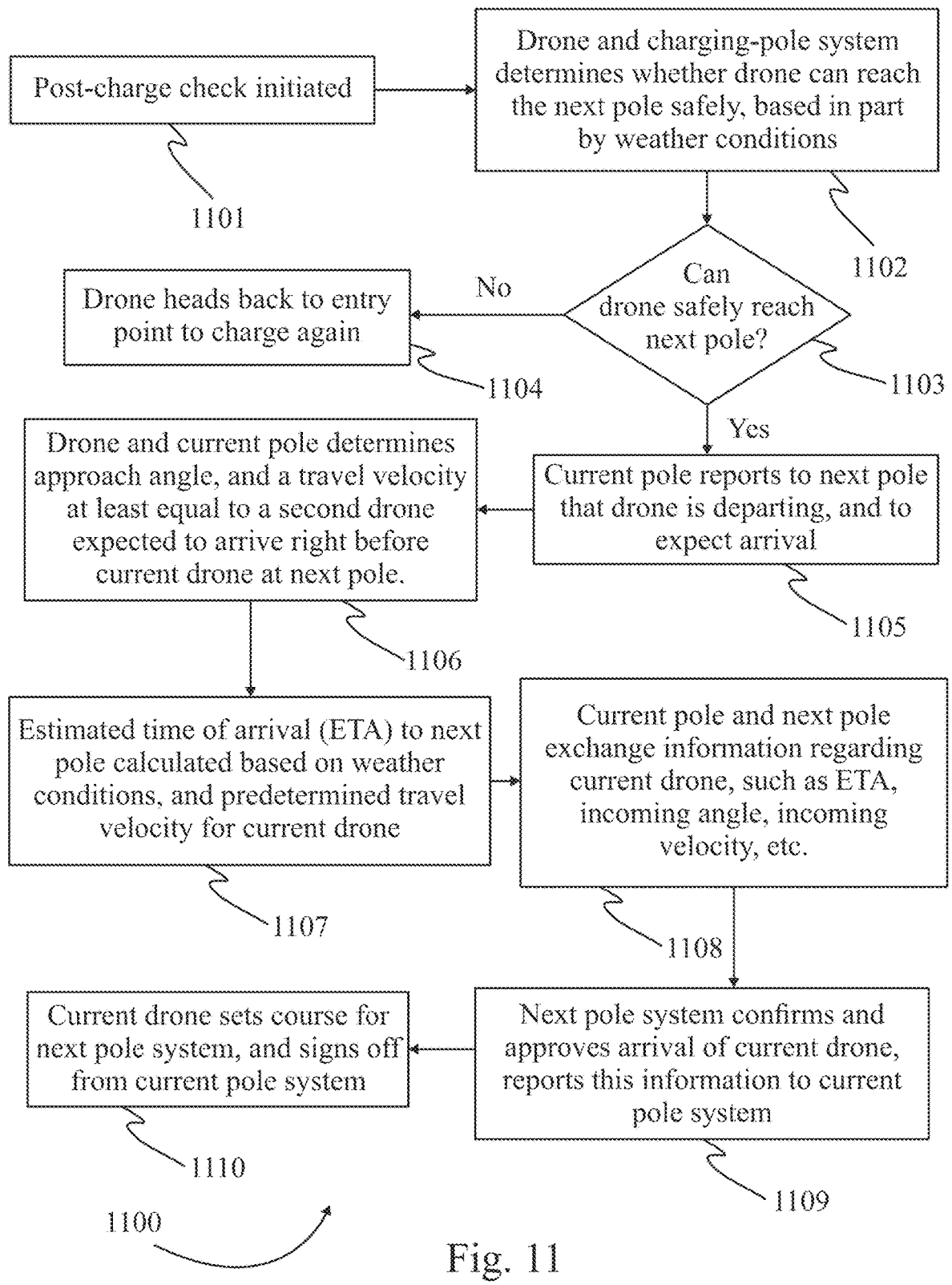
FIG. 11 is a flowchart of an example of a post-charging process between charging station and drone immediately disconnecting from charging according to one embodiment of the present invention.

FIG. 11 is a flowchart 1100 of a post-charging process before a drone departs from a present charging station system and heads towards a next charging station system or a final destination. At step 1101, a post-charge check is initiated. Checks that may be performed may include, but are not limited to, post-charge battery-level check, and drone status updates in case maintenance issues occurred.

At step 1102, a controller of the present charging station system performs a calculation based on weather conditions and the drone's post-charge status to ensure that the drone may reach a next destination safely. At step 1103, if the drone has been determined to not be able to reach the next destination, step 1104 is reached, and the drone may be re-added to a queue to be charged further. The queue position of the drone to be recharged may be in front of drones that haven't reached the present charging station system.

As the drone re-enters the queue, the speed of other incoming drones may be adjusted on-the-fly via wireless communications controlled by the controller to prevent hovering of drones around the present charging station system. Returning to step 1103, if the drone has been determined to be able to reach the next destination, step 1105 is reached, and the present charging station system may alert a next charging station system that the drone is departing and to expect arrival.

At step 1106, direction and a travel speed is determined that is at least equal to a second drone on the queue that is scheduled to arrive at the next charging station system immediately before the present drone. At step 1107, an estimated time of arrival at the next charging station system is calculated, based on at least information pertaining to weather conditions, and the determined travel velocity. At step 1108, the present charging station system reports to the next charging station system the gathered information. At step 1109, the next charging station system accepts arrival of the drone and sends a confirmation to the present charging station system. At step 1110, the drone signs off from the present charging station system and begins flying towards the next charging station system at the pre-determined velocity.

The scenario in FIG. 11 is for a drone traveling from one charging station system to a next charging station system. In a situation in which the next destination is the final destination, the process may end as early as step 1102. It will be apparent to one with skill in the art, that the embodiments described above are specific examples of a single broader invention which may have greater scope than any of the singular descriptions taught. There may be many alterations made in the descriptions without departing from the spirit and scope of the present invention.

Figure 12:
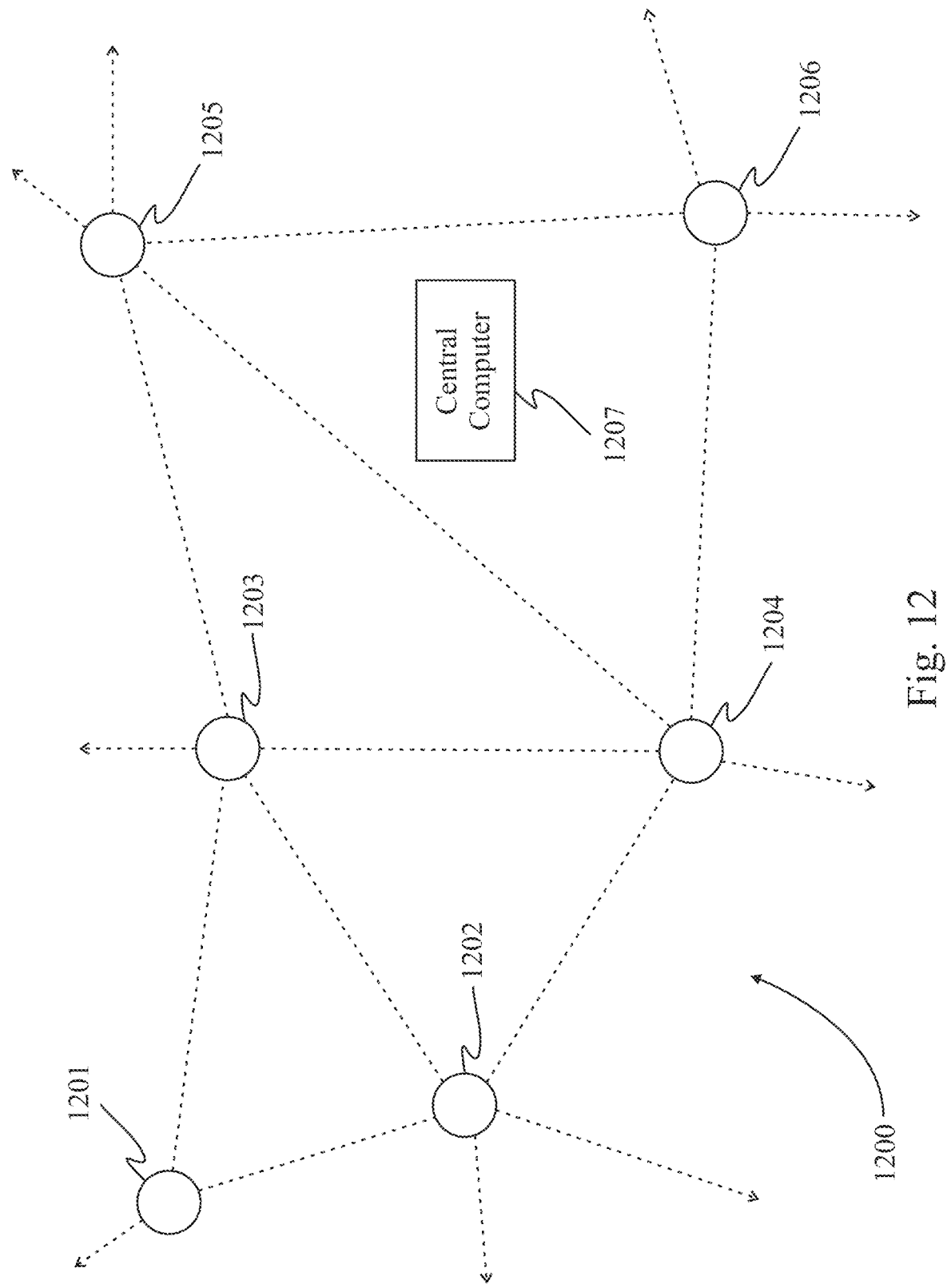
FIG. 12 is an illustration of a segment of an example system according to one embodiment of the present invention.

FIG. 12 is an illustration of a segment 1200 of an example system according to one embodiment of the present invention. Segment 1200 comprises a plurality of charging station systems 1201, 1202, 1203, 1204, 1205, and 1206. Each of the charging station systems may be linked to a number of other charging station systems through predesignated communication paths, which may be wireless or land-line paths. For example, charging station system 1201 is shown as linked to charging station systems 1202 and 1203 in FIG. 12. Any drone that has finished its charging cycle and is reported to be heading eastward may be directed towards charging station system 1203, while any drone heading southward may be directed to charging station system 1202. It should be understood that other charging station systems may exist outside the boundaries covered in FIG. 12.

Figure 13:
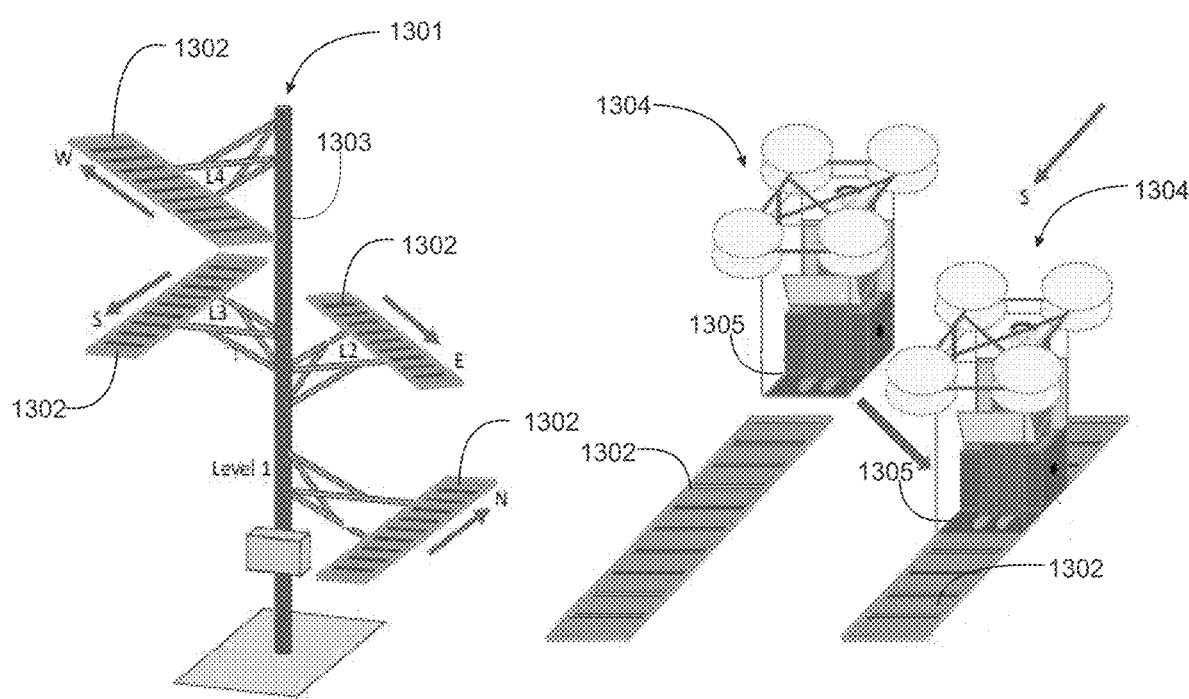
FIG. 13 is an illustration of a charging station in an alternative embodiment of the invention.

FIG. 13 is an illustration of an arrangement of apparatus and a method for charging pods and drones not described above. Pole 1303 in this illustration is analogous to the central pole 301 described above with reference to FIG. 3. In the embodiment described here with reference to FIG. 13, however, the apparatus and charging method employs rows of charging pads 1302. The central pole in this example supports four rows of charging pads for four different drone charging directions, all at different levels, Level 1 to L4.

Charging is provided from a row of charging pads 1302 that are supported by struts from pole 1303. Pads 1302 wirelessly power-connect to a charging receiver at the base of the drone pod's battery at 1305. As a pod approaches the charging zone, sensors detect when the pod is close to the elevated charging pads 1302, and the pod's computer activates the charging receiver underneath the battery to be ready to be charged. The pads charge the pod's battery while the pod is passing over the pads 1302.

Figure 14:
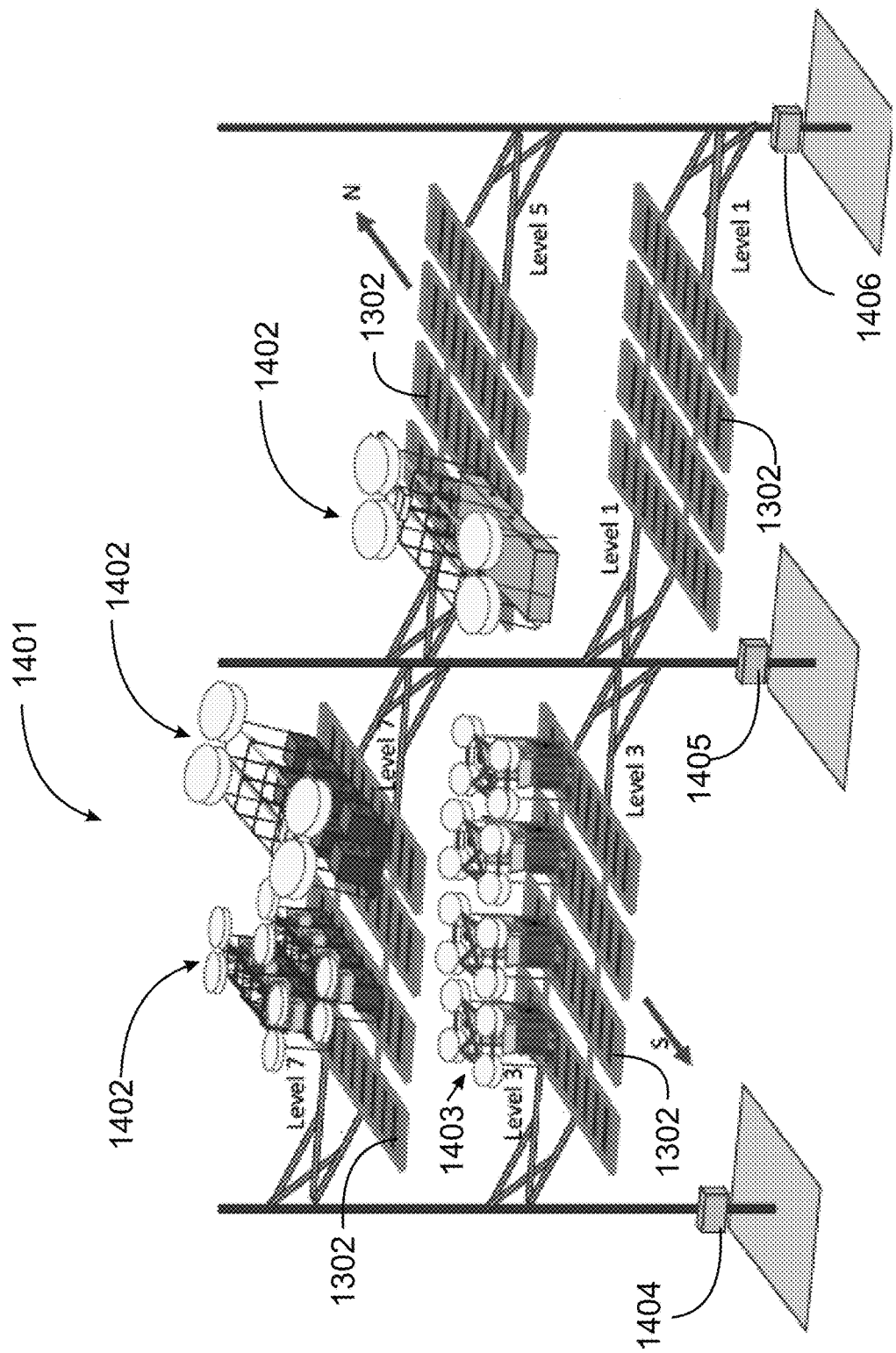
FIG. 14 is a charging station in yet another embodiment of the invention.

Charging stops when the pod has just passed the last pad in the row of pads. The pole controller manages the power and communications with other poles and nearby exchange stations. It will be clear to the skilled person that there are a number of variations that may be made in the example just described, within the scope of the invention FIG. 14 illustrates how charging 4-Pod drones and 1-Pod drones can be achieved via multiple rows of wireless pads above a freeway or street. N, S, E, W directions are relative directions, just for ease of explanation, and need not be in those directions.

The central pole 1303 can be in the central reservation of a freeway or the middle of a street. The west and east poles can be located just off the freeway or road, or, in a town can be off tall buildings. North-south going 1-pod drones 1403 are shown being charged at Level 3 (north to south) and Level 1 (south to north, pods not shown). North-south going 4-pod drones 1402 are shown being charged at Level 7 (north to south) and Level 5 (south to north, pods not shown). West pole controller 1404, mid-pole controller 1405, and east pole controller 1406 work together to control the charging of all the drones.

Figure 15:
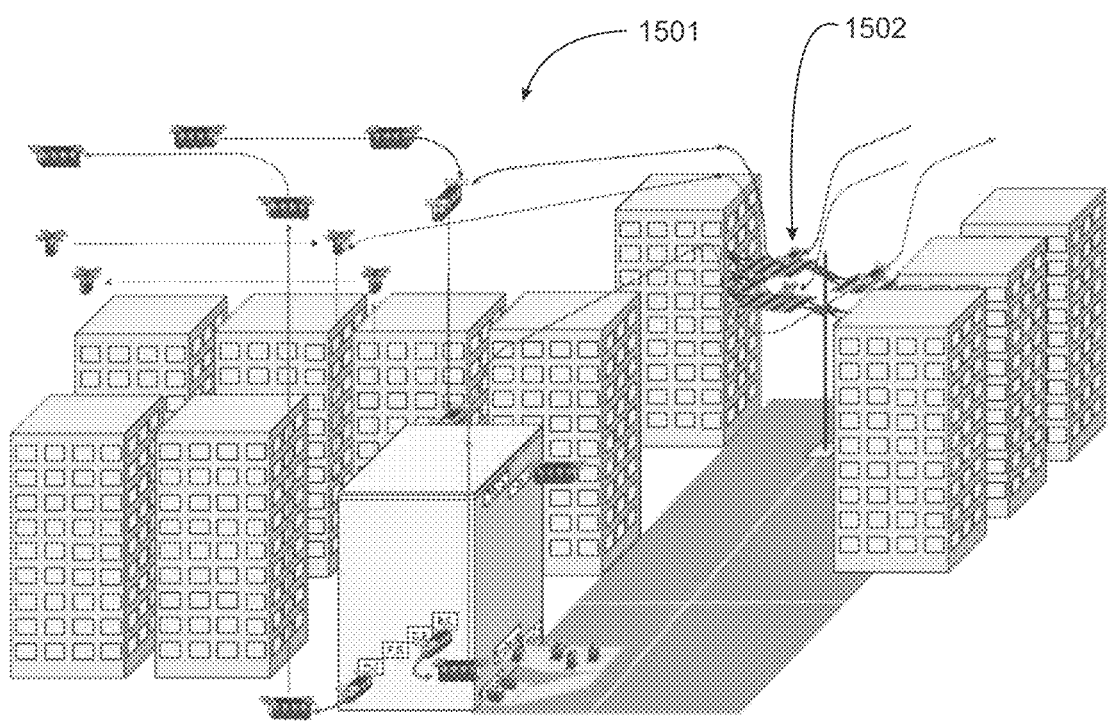
FIG. 15 is an illustration of a charging station in still another embodiment of the invention.

Note that the heights of the charging stations on the poles shown in FIGS. 13, 14 and 15 almost certainly will not be the same heights as higher droneways. This means drones approaching poles will have to descend to a lower height before joining the pole zones and then ascend again after charging is complete. The rows of pads could be separated by a distance that also allows big-pods with two rows of seats with charging receivers underneath to be charged. Similarly, drones carrying freight or goods in a single wide specially designed pod could be charged.

FIG. 15 shows how the wireless charging pad method may be applied in a town or city, perhaps nearby a tower exchange station. In FIG. 15, the west and east poles are replaced by the struts fixed to the buildings on either side of the street at region 1502. If, for example, the charging length of the pads is 10 m, and if the drone is traveling at 45 kph and doesn't slow down for charging, then speed during charging=45×1000/3600 m/s=12.5 m/s, and charging will take 10/12.5=0.8 s. If the pod battery energy density is 400 Wh/L, and the battery is 100 L, battery charge capacity is 40 kWh. Assuming that the battery is charged up the same amount that it discharges before its next charge, then the battery receives 0.5% of full charge during charging=0.2 kWh, and drone battery discharges 1 kWh over 5 km, then pod can travel another 1 km before it needs to be re-charged to the same level. Charge rate needs to be 0.2 kWh in 8 s, so charger must charge 0.2×3600/0.8 kW=900 kVA or say 1000V @ 900 A. This is still a lot of V and A for wireless power! But in the nearer future, it might be more practical to have the poles 200 m apart, for 1000V at 180 A.

In the descriptions above referring to FIGS. 13, 14 and 15, the rows of charging pads are substantially planar and horizontal, and there is a charging receiver, also oriented horizontally at the base of the pod battery at the lower extremity of the pod. In an alternative arrangement the wireless pads might be in a substantially vertical plane, and the charging receiver pads on the pods would be implemented to be complementary to the orientation of the charging pads.

It is understood by the inventor that there may at times be maintenance and repair issues with drones in service and operation, and that a system of charging stations as proposed and described in enabling detail in this application will afford an opportunity for addressing such issues. For example, there may be facility added at individual charging stations, or at every one of the drone charging station systems to allow a drone to land, and power down, and be serviced by personnel who may be associated with an enterprise hosting such charging station systems. The central computer aspects, and the communications aspects are useful in providing such services as well. Control procedures may be added at charging stations to direct drones to land for service and to take off again, and to record service instances, for example.

Segment 1200 may also have a central computer 1207 which may receive transmissions from charging station systems within a designated range. Transmissions that may be received may include, but may not be limited to, system alerts, weather alerts, maintenance requests, and tracking and positioning of various drones around the charging station systems. Central computer 1207 may be connected to a wide-area network, where it may connect with other central computers of other system segments to cover a more comprehensive area.

In various embodiments of the invention an important issue in drone recharging is spacing of recharge stations, which is a function of drone range and charge times. Table 1 below shows how different parameters affect pole spacing. Calculations are based on an assumption that a drone acquires enough charge at each station to discharge a substantially equal amount to reach the next charging station. On the last leg of a trip a drone may need to travel further than standard station spacing, for example to someone's remote house, so the drone will need sufficient charge so that it can be able to discharge all the way to a re-charging destination. A longer charge time enables a longer distance between stations.

In development of charging systems battery charging rate capability could increase up to 60 kWh/min. This may be crucial to allow drones to fly by stations faster to minimize queueing or to allow shorter gaps between drones. Also, the faster the mechanical engagement and disengagement times are the longer the charge time can be. The fastest charge time is if the drone can fly by at cruising speed $V_c$, but this requires the drone to flyby in less than a second which probably will be some time in the future.

TABLE 1

| Discharging Battery | | | | | | | | | |
| --- | --- | --- | --- | --- | --- | --- | --- | --- | --- |
| Total Rotor Motor Power | kW | 30* | 30* | 30* | 30* | 30* | 15* | 15* | 15* |
| Drone Cruise Speed | km/h | 45* | 90* | 90* | 90* | 90* | 90* | 90* | 90* |
| Drone Cruise Speed | m/s | 12.5 | 25.0 | 25.0 | 25.0 | 25.0 | 25.0 | 25.0 | 25.0 |
| Discharge Distance | m | 1000* | 1000* | 2000* | 1000* | 1000* | 1000* | 1000* | 1000* |
| Max Distance Between Stations | m | 1000.0 | 1000.0 | 2000# | 1000.0 | 1000.0 | 1000.0 | 1000.0 | 1000.0 |
| Drone Time Between Stations | s | 80.0 | 40.0 | 80.0 | 40.0 | 40.0 | 40.0 | 40.0 | 40.0 |
| Drone Discharges | Wh | 666.7 | 333.3 | 666.7 | 333.3 | 333.3 | 166.7 | 166.7 | 16.7 |
| Charging Battery | | | | | | | | | |
| Charge Voltage | V | 1000* | 1000* | 1000* | 1000* | 1000* | 1000* | 1000* | 1000* |
| Charge Current | A | 100* | 100* | 200* | 400* | 1000* | 400* | 1000* | 1500* |
| Charging Time | s | 24** | 12** | 12** | 3# | 1.2# | 1.5# | .6** | .4** |
| Pole Charge Distance | m | 10* | 10* | 10* | 10* | 10* | 10* | 10* | 10* |
| Minimum Cable Length | m | 7.1 | 7.1 | 7.1 | 7.1 | 7.1 | 7.1 | 7.1 | 7.1 |
| Drone Speed at Station m/s | m/s | 0.4** | 0.8** | 0.8** | 3.3# | 8.3# | 6.7# | 16.7 | 25.0 |
| Drone Speed at Station km/hr | km/h | 1.5** | 3.0** | 3.0** | 12# | 30# | 24# | 60.0 | 90.0 |
| Drone Charge (=Discharges) | Wh | 666.7 | 333.3 | 666.7 | 333.3 | 333.3 | 166.7 | 166.7 | 16.7 |
| Min Time Between Drones | s | 28.8 | 14.4 | 14.4 | 3.6 | 1.4 | 1.8 | .7** | .5** |
| Min Gap Between Drones | m | 360.0 | 360.0 | 360.0 | 90.0 | 36.0 | 45.0 | 18.0 | 12.0 |
| Max No. Drones/Hr | D/h | 125.0 | 250.0 | 250.0 | 1000# | 2500# | 2000# | 5000.0 | 7500.0 |
| Charge Rate | Kwh/m | 1.7 | 1.7 | 3.3 | 6.7 | 16.7** | 6.7 | 16.7** | 25.0** |

\* (single asterisk) = manual entry
\*\*(double asterisk) = undesirable
\# (pound sign) desirable In Table 1, all combinations use 10 m charge length, all use 7.1 m minimum cable length, all use a total of 30 KW motor power except options 6-8 that assume increased cruising efficiency with 15 kW, all use 1000V charge voltage, all except #1 have a cruise speed 90 km/h, all pole spacing is 1 km but #3.

Summary of Options:

1. Charge of 100 A, cruise speed 45 km/h, pole speed 1.5 km/h, charge time 24 s at pole, can handle 125 drones/h
2. Charge of 100 A, pole speed 3 km/h and charge time 14 s at pole can handle 250 drones/h
3. Charge of 200 A, pole speed 3 km/h and charge time 14 s at pole, can handle 250 drones/h
4. Charge of 400 A, pole speed 12 km/h and charge time 3.6 s at pole, can handle up to 1000 drones/h
5. Charge of 1000 A, pole speed 30 km/h and charge time 1.4 s at pole, can handle up to 2500 drones/h
6. Charge of 400 A, pole speed 24 km/h and charge time 1.8 s at pole, can handle up to 2000 drones/h
7. Charge of 1000 A, pole speed 60 km/h and charge time 0.7 s at pole, can handle up to 5000 drones/h 8. Charge of 1000 A, cruise and pole speed 90 km/h and charge time 0.5 s at pole, can handle 7500 drones/h Option 6 best. Options 7 and 8 are ideal but may be too difficult to implement initially There are a number of other factors that may affect calculation of various parameters having to do with spacing and operation of charging. One such factor is electric power. Electricity will need to be provided to the charging stations. From Table 1 this could easily be 400 Wh per charge for 5000 times per hour or 2 MWh per hour or 2 MW per station. This could be even higher if all four (or more) positions on a station are fairly active. So, there will need be high voltage cabling, like 110 kV AC with transformers, rectifiers and DC-DC converters per station. But preferably there would be dedicated high voltage DC cable feeders which may be less expensive, because just a DC-DC converter is needed. It might be dangerous for above-ground high voltage cabling with the drones flying around, so underground cabling is recommended.

The diameter of the cable wiring may be quite large, for example 200A requires about 0 AWG gauge copper or about 1 cm diameter, and 400 A will require two of these and 800 A four. So, this cable may be difficult to bend, such as when approaching midpoint, it may be better to withdraw the cable into a coil. And there will be two of these, for positive and negative. The resistive losses in the two cables will also be large, like 2 mohm*2 for 7 m of 0 AWG at 200 A=160 W, or for 400 A, 320 W, and for 800 A, 640 W. This does not include wiring cable losses up the pole.

If a much higher voltage than 1000V can be taken up the pole into a DC to DC converter, this would save power loss, but requires the inverter to be near the charging cables on the pole. This would require up to a 1 MW inverter which would probably be too large to be fitted higher up the pole. It would be logical to increase the voltage to the drone to avoid a DC to DC converter, so there would be a direct connection from the underground electricity to the drone. This means even more carefully designed cabling and receptacles. Also, the drone battery technology will have to improve a lot from the present 2-4 hours charging time needed for the eHang184 drone, but this could be feasible with charging large ultra-capacitors which should be available by droneway introduction.

Weight of load for traveling drones will also be a factor. The drone must be capable of measuring the weight of the person or freight, because this affects the power used and the distance. A heavier load will require more charge to reach a pole or destination. This weight variation could be compensated for by adjusting the charging current I. And this will vary with wind speed. The drone will refuse to take off if it's maximum load is exceeded.

Weather will also be a factor in design and control. Weather also affects operation of the drones. For example, if a drone is traveling south to north and there is a prevailing wind of 10 m/s from north to south, the drone will be slowed by this amount.

So, although the airspeed is still $V_C$, the ground speed is $V_C$—10 m/s, and the drone will take longer to get to the next station, or it will need to go faster to maintain $V_C$ ground speed. If there is a cross wind, the drone will have to fly at an angle to the intended direction, to maintain the path required by the GPS data. Because the charging speed at the pole, $V_P$ is usually a lot less than cruise speed $V_C$, wind speed will have much more of an effect when the drone is at the charging station.

At the charging station, the drone will have to speed up or slow down depending on wind direction, to maintain a ground speed of $V_P$ m/s. Or with a crosswind the drone will not be parallel to the relevant charging zone of the station, causing the cable receptacle to be at some angle to the drone. The receptacle design will have to allow for misalignment of direction. In such cases, the drone needs to counteract the wind speed and direction, and it will have to rotate slightly and speed up or slow down to maintain the GPS calculation of direction.

In preferred embodiments each station may detect both wind speed and direction, and feed this information, or derived information for navigation, to the drone approaching the station. For a drone traveling between stations at speed $V_C$, a good approach would be, as the drone is leaving a station, to use that pole's wind information, and then as it gets nearer to the target station, to use more and more of the target station's wind speed information and less of the first station. Obviously for really strong winds, it may be safer not to fly, but this will get more and more unlikely as time moves on and technology improves.

Also, the pole and drone receptacles will have to be designed to allow for rain, snow etc., to ensure no shorting can occur at the high voltages expected. Some high-speed shutter cover mechanism will be needed to open just before the two receptacles engage, possibly with the pole receptacle already inside the drone receptacle.

In regard to wind, and adjustments that may need to be made to drone navigation relative to charging stations, calculations for head winds, following wind and the like, are well-known in the art, and may be applied in this case to determine extra charge that may be needed in some cases. It may be in some cases, that an extra charge, say 20%, may have to be made to account for a head wind, for example.

This patent application teaches an alternative method of transportation using new technologies that will soon be making passenger and freight drone flights both faster and more carbon friendly than road-based transport. This is especially true in heavy traffic, such as at rush hour, where most cars travel at just a few km per hour. The drone approach taught here allows for much higher speeds, where the drone is at a full speed of around 90 km/h for perhaps 1 km between charging stations, although slower for less than 20 m at the charging station. This includes charging distance of 10 m in the fly-by zone and slowing down to flyby speed and speeding up afterward to cruise speed. So, for perhaps 2% of the journey the drone is at a slower speed, which is still faster than commute vehicle traffic speeds. So, the average drone speed could easily be around 90 km/h, and as time goes on and the technology improves much faster.

At some point the issue becomes: how close to a person's home and work or elsewhere will a drone be available. This now comes to the new technology of ride calling and sharing. If a passenger calls up a ride sharing company and requests a ride, if this ride is from a drone that comes to collect the person, then the drone will come from some nearby location, hopefully fully charged, may exit the droneway, and find its own way to the person. The person gets in the drone, the drone requests the person if they are ready for takeoff, and if so, then automatically takes off and goes to the nearest droneway and merges in as described. At the last station before the final destination, the drone exits the droneway and flies to a landing place near the destination. This is a highly likely circumstance, as ride calling will be a standard way of traveling in the near future, that is presently just for cars. The user will just pay upfront for the requested journey as with Uber now.

A likely scenario for this new technology to become ubiquitous will require a major infrastructure development of droneways with pole-based charging stations every 1 km or so, and ground-based charging stations for longer distance travel that are likely to be used as rest areas. From a safety standpoint, theoretically droneways should be safer than road transport, once standards have been accepted, for autonomous drones and the networks controlling them. But pole-based elevated charging requires new ideas that will need to be debugged and made extremely reliable before passengers can travel in droneways. It is likely that drones will first carry small goods to iron out reliability issues.

From a cost standpoint, buying land and building charging stations for ground-based stations will be expensive. For land for the poles, it is likely that local transport entities like freeway/motorway managements and local councils will provide space for the poles to be built. There should be minimal noise, as nobody will be blowing horns or revving engines, the drone motors will be quiet, and so should the engaging and disengaging of the cables and so on at the poles.

Another issue might be how many drones per hour could use a droneway, especially at rush hour. Option 6 in Table 1 would be 2000 drones per hour, with Option 8 going to 7500 drones per hour. Commute traffic on smaller roads will be able to manage this usage, but for larger freeways, either more people per drone or more parallel droneways or both will be needed. But while the technology is being introduced, 2000 drones per hour may be sufficient. As the technology improves, more drones per hour will be introduced.

Clustering Charging Facilities and Managing Charge Time

It is understood that a pod/drone battery requires frequent recharging during travel. Therefore, charging facilities are made available along the travel path of a drone assisted vehicle. It is also understood that regardless of charging method and utility, traffic control is required to keep traffic moving fluidly through charging facilities. It is desired that charging events are as short as possible and that any traffic anomaly occurring between charging facilities such as time shift in schedule, emergencies, rout or schedule changes, and the like be communicated to a computerized transportation controller and that such irregularities can be mitigated in real time by that controller.

In various embodiments described in enabling detail herein, the inventor provides a unique system for managing vehicle traffic including drones and drone-assisted parcel and passenger pods over a determined or dedicated travel path and reducing battery charging times of vehicles, including aerial vehicles assisted by drone traveling through flight or route-assigned cluster networks of available vehicle charging facilities. The present invention is described using the following examples, which may describe more than one relevant embodiment falling within the scope of the invention.

Figure 16:
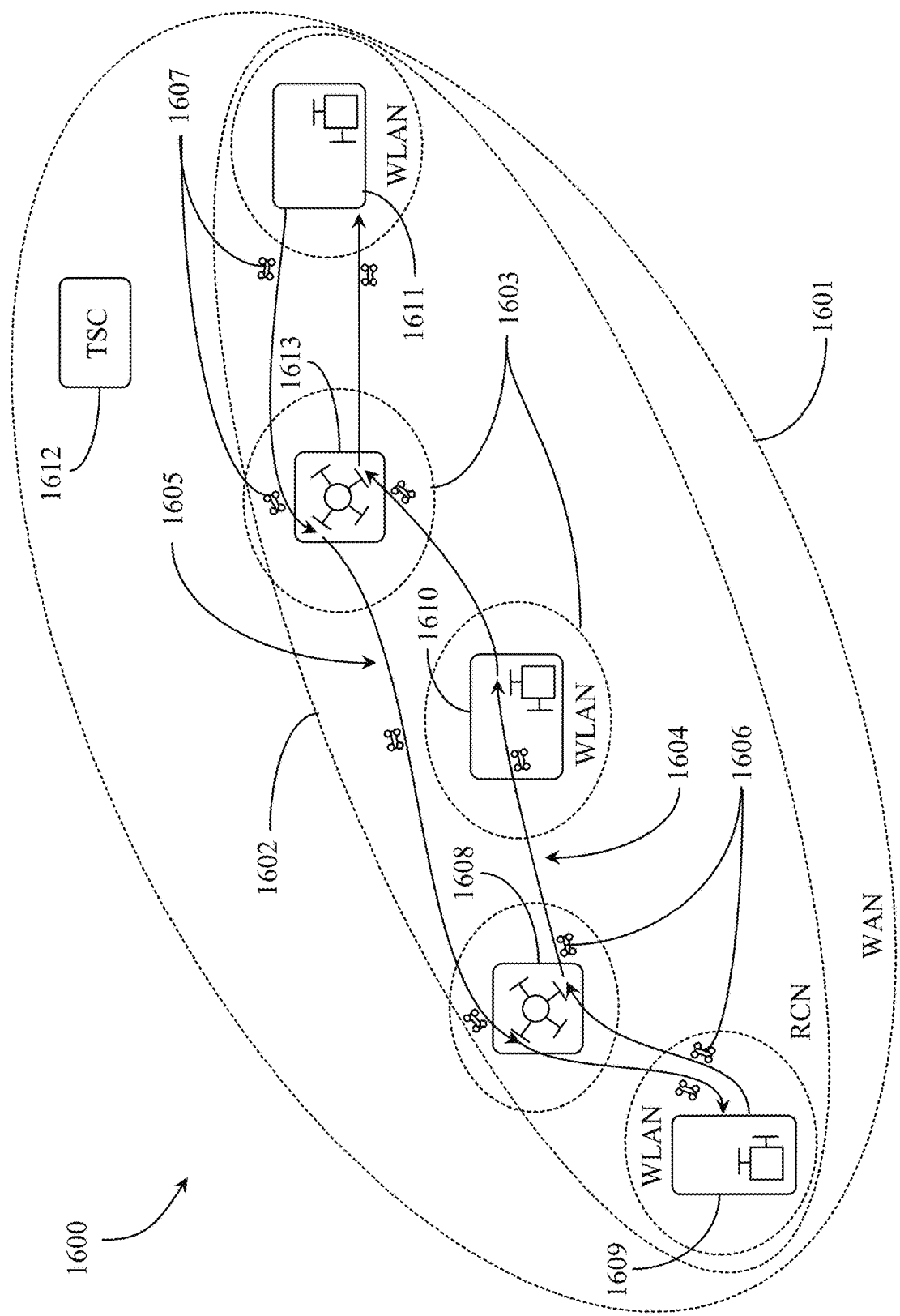
FIG. 16 is an architectural overview of a drone/pod charging network termed a cluster network created along a calculated drone/pod flight or travel path according to an embodiment of the present invention.

FIG. 16 is an architectural overview of a drone/pod communications and control network 1600 supporting dynamic assignment of charging stations to support a planned travel route for a drone, drone-assisted passenger pod, or drone assisted parcel pod. It is noted herein that the methods and apparatus of the invention may have applicability to rail pod cars and ground-based pod cars. Moreover, the methods an apparatus of the invention also have applicability to routes featuring vehicle exchanges where the vehicles travel by different modes. Communications and control network 1600 includes a wide area network (WAN) 1601. WAN 1601 may be a five or six gigahertz wireless network carrier covering a geographic region, within which, an electric vehicle passenger transportation and parcel delivery network may be operated charging network according to an embodiment of the present invention.

For the purpose of discussion, the concept of such a transportation service and system envisions provision of drone assisted operated, and in some cases autonomous vehicles referred to herein as drones or drone-connected pods. A drone-connected pod may be a passenger pod or a parcel delivery pod coupling to an appropriate drone array to enable directional flight of the passengers or parcels along ordered flight paths at assigned elevations that may differ for differing categories of vehicle. While pods may also be coupled to ground chassis for driving them and for transporting them over a rail, the present specification addresses drone assisted vehicles primarily whose routes may be more flexible than rail or ground based traffic and that because of elevations during flight, would be more dependent than a rail car or wheeled car on safe battery charge level.

It should be noted herein that while the following description pertains largely to managing flight parameters of aerial electric vehicles and controlling charging events for those vehicles, similar aspects of the present invention may be utilized for ground-based electric vehicles and for rail-based electric vehicles. Ground based vehicles may be described as a passenger pod car or a parcel pod car, wherein the pod is coupled to a wheeled frame driven on a roadway by electric motor navigable by an operator in the pod and by an on-board or remote software controller. Rail supported vehicles may be described as passenger and parcel pod cars coupled to a rail by special wheeled track chassis driven by electric motor and navigable by an operator in the rail pod and by on-board or remote software controller.

Referring now back to FIG. 16, WAN 1601 represents the primary communications network capable of 5G and later 6G communication with no range limit. General Tasks such as transportation booking, scheduling, and public administration tasks like billing may be handled over WAN 1601. A computerized node referred to herein as a transport system controller (TSC) 1612 is provided within the geographic region of WAN 1601. TSC 1612 is adapted in this embodiment as a computerized transport system controller station that may monitor and mitigate certain flight parameters of active vehicle traffic wherein each individual transport vehicle has a default travel itinerary including a defined route, departure time, expected arrival time, and a selected number of stops along the route for such as charging, vehicle/passenger exchange, parcel delivery, parcel unloading/loading, etc.

A transport system controller like TSC 1612 may be one of several such controllers that may be distributed over a large transportation infrastructure covered by WAN 1601. In this embodiment, one TSC 1612 is depicted and is deemed sufficient for explanatory purposes. Transportation infrastructure in general may refer to facilities that are part of a transportation infrastructure and network including exchange stations facilitating vehicle and passenger exchange, charging stations disbursed there between, and embarking and debarking stations, which may also include exchange station facilities with in-house charging facilities.

In this architectural view, a route cluster network (RCN) 1602 is depicted. RCN 1602 is an instant example of a dynamically created network of transportation system facilities that are interspersed at strategic locations along a booked route of one or more than one travel vehicle such as drone-assisted vehicles 1606 traveling in a first general direction, and drone-assisted vehicles 1607 traveling in a second general direction. RCN 1602 may use 5G/6G capacity wireless communications capability and typically has a defined end-to-end range. RCN 1602 may be created by TSC 1612 for one or more vehicles assigned to travel from a known departure station or location to a known destination station or location.

RCN 1602 may be a geographically long or geographically short linear network of facilities defined as mandatory stops, including charging stops for vehicles traveling from a start point to a finish point. In another embodiment where a vehicle route may not be linear (shortest route between two points), for example, a route containing several parcel service delivery destinations, RCN 1612 may define a circular pattern of facilities, an angular pattern of facilities, or an accurate pattern of facilities. Facilities containing vehicle charging stations and apparatus are typically located within certain maximum distance from one another for charging purposes. For example, a charging facility should be available en route well before the full average distance traveled on one full battery charge for a passenger pod or parcel pod coupled to a drone array (drone assisted).

It is noted herein that RCN 1602 includes a facility 1609. Facility 1609 may server as an exchange facility, a boarding facility for travelers, a debarking facility for travelers, or any other associative facility. Facility 1609 includes a charging facility. Drone-assisted vehicles 1606 traveling NE may board at facility 1609 and may travel to facility 1611 as an end destination where passengers may shop, work, conduct business, etc. Likewise, travelers in drone-assisted vehicles 1607 heading SW may start the journey at facility 1611, which includes at least one charging facility, and may travel to facility 1609 as an end destination.

An RCN representing a routine travel itinerary for a worker using the transport system as a passenger to go to work and back, for example, may be a permanent travel itinerary for the commute that is saved for that worker by TSC 1612. The worker may routinely travel from facility 1609 to facility 1611 and back to facility 1609 every day. In the center portion of RCN 1602 is a dedicated exchange station 1610. Stations 1609, 1610, and 1611 have local communications coverage via wireless local area networks (WLAN) 1603. WLAN 1603 may be an advanced wireless fidelity (WiFi 6) mesh network having a physical range of about one hundred meters about the facility.

RCN 1602 includes two dedicated charging stations depicted herein as a charging station 1608 and a charging station 1613. Charging stations 1608 and 1613 both include a WLAN 1603. When a user orders a transport service a TSC like TSC 1612 may receive the departure, stop, and end destination data for a travel event and may use technical data such as (vehicle) battery charge capacity, travel miles per full charge (per vehicle), and may apply system rules to determine the scope of a route cluster network that may be assigned for that traveling individual or service operator.

RCN 1602 includes facilities 1609, 1608, 1610, 1613, and 1611 as TSC selected stations where the traveler or operator will be engaged with during travel of the route. Although each mentioned facility may provide a host of varied services all the stations include at least one charging facility for charging the vehicles used to travel the route. Dedicated charging stations 1608 and 1613 are described as pole charging stations that provide charging apparatus fixed to a vertical pole. The charging pole may include steel rail charging apparatus, referred to by the inventor as a slider apparatus fixed at various elevations vertically and at differing rotation angles about the central charging pole. The charging pole may include vertically oriented wireless pad charging apparatus fixed at various elevations vertically and at various points of rotation about the central charging pole.

Facilities 1608 and 1613 are dedicated to quickly recharging drone-assisted vehicles during flight and may perform charging very quickly using either the rail charging apparatus or the wireless pad charging apparatus. A charging pole may also host cable charging apparatus and rod charging apparatus as is described further above in discussion of FIGS. 4A through 5B. Rail charging using an apparatus termed a slider and or pad charging using wireless quick charging pads arranged vertically provide faster charging for passing aerial vehicles than do coupling apparatus using articulating cables or rods. An advantage of charging with rails or pads is there are no moving parts. Another advantage is a much-reduced time to position and implement a full charge to a pod battery or a drone battery.

RCN 1602 is dynamically created by TSC 1612 and is associated with a travel event defining the facilities that are engaged over the route, more particularly charging facilities. A passenger pod may carry one to multiple passengers as pods may be connected to one another resulting in larger vehicles with proportionally more drone power. A parcel pod is simply a drone-assisted vehicle that can be used for delivering mail, packages, parcels, material goods, groceries, etc. The average distance a drone-assisted vehicle such as a passenger pod or a parcel pod may travel on a full battery charge is a known variable. The distance may vary somewhat depending upon payload weight, wind conditions, average speed of the vehicle, or other factors.

Charging facilities are distributed throughout the transportation network infrastructure such that there is a charging station or facility roughly every x meters from another charging station where x may be a value significantly less than the average distance in meters a full battery charge will take an aerial vehicle. In one example, if a drone-assisted aerial vehicle can achieve 60 miles distant on one battery charge then charging facilities may be distributed no less than 45 miles or so from one another in the infrastructure. A drone-assisted vehicle or a ground or rail-based vehicle will be fully charged when a travel event requires the vehicle to ferry passengers, cargo, or parcels. For example, in an exchange station a passenger or passenger group may simply transfer to another passenger pod that is already fully charged and waiting for them to board.

It is noted herein that dedicated charging stations like station 1608 and 1613 support charge rails, also referred to as a slider, at desired elevations (horizontal rail set) and at desired angles relative to three-hundred-and-sixty-degree rotation about the central charging pole. Wireless charging pads may be likewise arranged. One charge pole may include more than one type of charging apparatus including a ground based apparatus at the bottom of the charge pole, which may be a slider apparatus or a wireless pad apparatus, and a rail-based apparatus at an elevation suitable for rail-based traffic.

It is preferred, but not absolutely required, that the interface between charging medium such as rail or pad and receiving apparatus, a passenger or parcel pod, be located on the side of the drone-assisted vehicle, rail vehicle, or ground vehicle, to free the bottom side of the pods for coupling with the wheeled frames for rail cars and pod cars, and to expedite charging for drone-coupled vehicles, which may remain in flight and move past the rail to obtain a full charge. It is noted that charge time is the same for all vehicles using the slider or wireless charging pads. RCN assignment protects vehicles from low battery conditions during travel and enables a TSC like TSC 1612 to perform routing through the existing transport infrastructure in a manner that avoids bottle necks and long delays in travel or stops.

Figure 17:
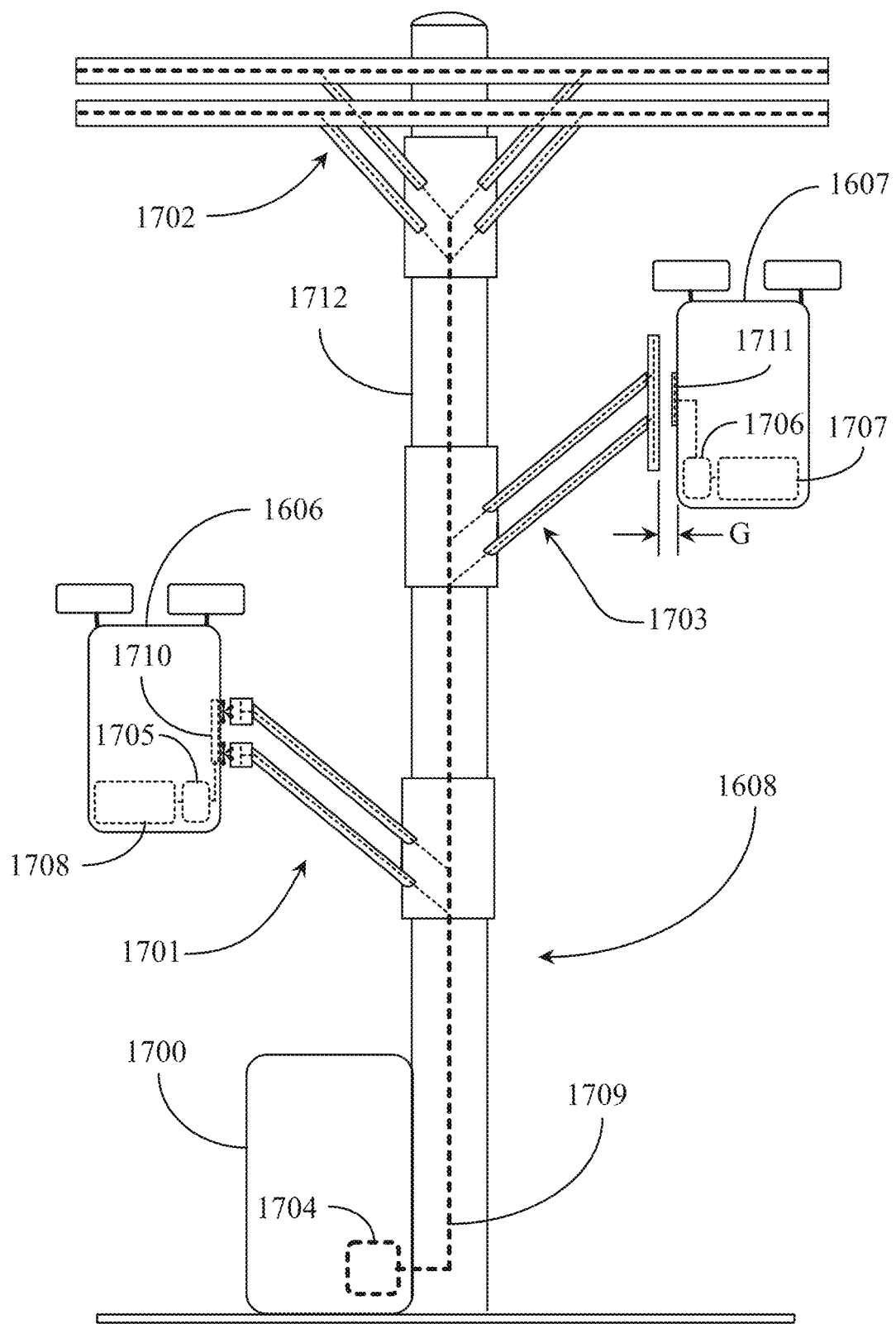
FIG. 17 is a plan view of a charging pole adapted to support multiple charging station locations vertically at different elevation points to accommodate drones carrying passengers and drones carrying parcels termed parcel drones.

FIG. 17 is a plan view of charging station 1608 of FIG. 16 adapted to support multiple charging station interfaces vertically at different elevation points to accommodate traveling vehicles carrying passengers termed passenger pods and traveling vehicles carrying parcels termed parcel pods. Station 1608 is unlike an exchange facility or some other multiple-service access point in the transport infrastructure. Station 1608 is a dedicated charging station in this implementation. In this embodiment, station 1608 includes at least one vertical charging pole 1712. There may be more than one charging pole included in charging station 1608. Charging pole 1712 is somewhat analogous in description to pole 301 of FIG. 3 further above.

In this implementation charging pole 1712 is adapted to support any variety and combination of existing charging apparatus for the transport infrastructure. A charging location 1702 is a slider apparatus. A charging location 1703 is a vertical wireless pad apparatus. A charging location 1701 is a slider apparatus rotated 90 degrees from apparatus 1702. Charging pole 1712 may be purposely outfitted with a same charging apparatus or a combination of differing charging apparatus.

A computerized pole controller 1700 is provided and is somewhat analogous to controller 302 of FIG. 3. The functions of controller 1700 may include, but are not limited to, communications with drone-assisted vehicles, communications with other charging station controllers, communications with a central computer, in this case TSC 1612 of FIG. 16, general communications, accessing emergency alert systems, regulation of charging power, and collection of local weather data and other third-party information that might be available to the public.

Power to controller 1700 and pole 1712 may come from an underground power cable (not illustrated). In this implementation, sliders and wireless vertical pads are used to charge drone-assisted vehicles 1606 and 1607 introduced in FIG. 16. Pole controller 1700 may include an ultra-capacitor 1704 capable of retaining a measured charge that is very high. Having an ultra-capacitor enables pole controller 1700 to load capacitor 1704 with enough power to charge a second ultra-capacitor located on the charging interface of a pod and having discharge capability into at least one pod battery.

In this implementation, drone-assisted vehicle 1606 includes ultra-capacitor 1705 discharging into a pod battery 1708. Drone-assisted vehicle 1607 includes ultra-capacitor 1706 discharging into pod battery 1707. In this view, vehicles 1606 and 1607 are both drone-assisted pods charging at an elevation suitable to their flight path elevation requirements. In one aspect, one may be a parcel pod and one may be a passenger pod. Vehicle 1607 includes a magnetic wireless receiver 1711 that receives electric charge from charge pad apparatus 1703 when the pod can be brought to within gap G of the vertical wireless pads. Charge circuit wiring with positive and negative terminal is implied and depicted in this example logically by power cable 1709 (broken line) and branch off wiring through the charging apparatus supports (smaller dotted lines).

Charge controller 1700 may be off or not "hot" in terms of sending a charge until it is required to deliver charges to vehicles. This is possible using ultra capacitors that may be quickly loaded and that can discharge in a quick manner. In this implementation, traveling vehicles include an ultra-capacitor on board having connection to the battery that may receive a charge from ultra-capacitor 1704. Vehicle 1607 includes an ultra-capacitor 1706 and vehicle 1606 includes an ultra-capacitor 1705.

Charge time is an extremely important network parameter for managing drone-assisted vehicles particularly. Slider apparatus and wireless pads may be powered in bursts while vehicles are connected by contact brushes or a pickup shoe or by wireless gap G. The high charge current may be received into the ultra-capacitors 1706 and 1705 before the battery is charged. Ultra-capacitors 1706 and 1705 may discharge at a high rate into the on-board batteries 1707 and 1708 respectively.

In this implementation charge time for a vehicle is reduced to the time it takes to load the vehicle's ultra-capacitor, which may only be seconds, the vehicle may be released from the charging apparatus with the knowledge that the full charge will be transferred from the vehicles ultra-capacitor to the vehicles battery while the vehicle has resumed on its designated travel path. Validation may be required to confirm the charge of the ultra-capacitor and that discharge into the pod battery is occurring before releasing the vehicle for travel to the next stop. A route cluster network (RCN) of charging points along a planned travel route is assigned to the entity that is paying for the travel namely a passenger, an agent representing a passenger group, a service ferrying passengers, or a parcel pod operator, or a parcel service utilizing the transport infrastructure to deliver parcels.

Route cluster networks are utilized in this embodiment primarily to ensure travel vehicles always have a safe battery charge level and to provide real time data from the charging stations or facilities defined in a RCN to a transportation system controller (TSC) for mitigating problems such as potential bottle necks along a travel route under TSC oversight. An RCN may overlap another RCN where one charging station has traffic from two different routes. RCNs are typically linear and bi-directional but that is not a limitation of the invention. For example, a parcel pod may have a first pick up point in an RCN to load parcels and then proceed on a circuitous route delivering to businesses near the transport infrastructure. The TSC creates the RCN for that operator and ensures that the required facilities that the vehicle must engage are working and available.

Figure 18:
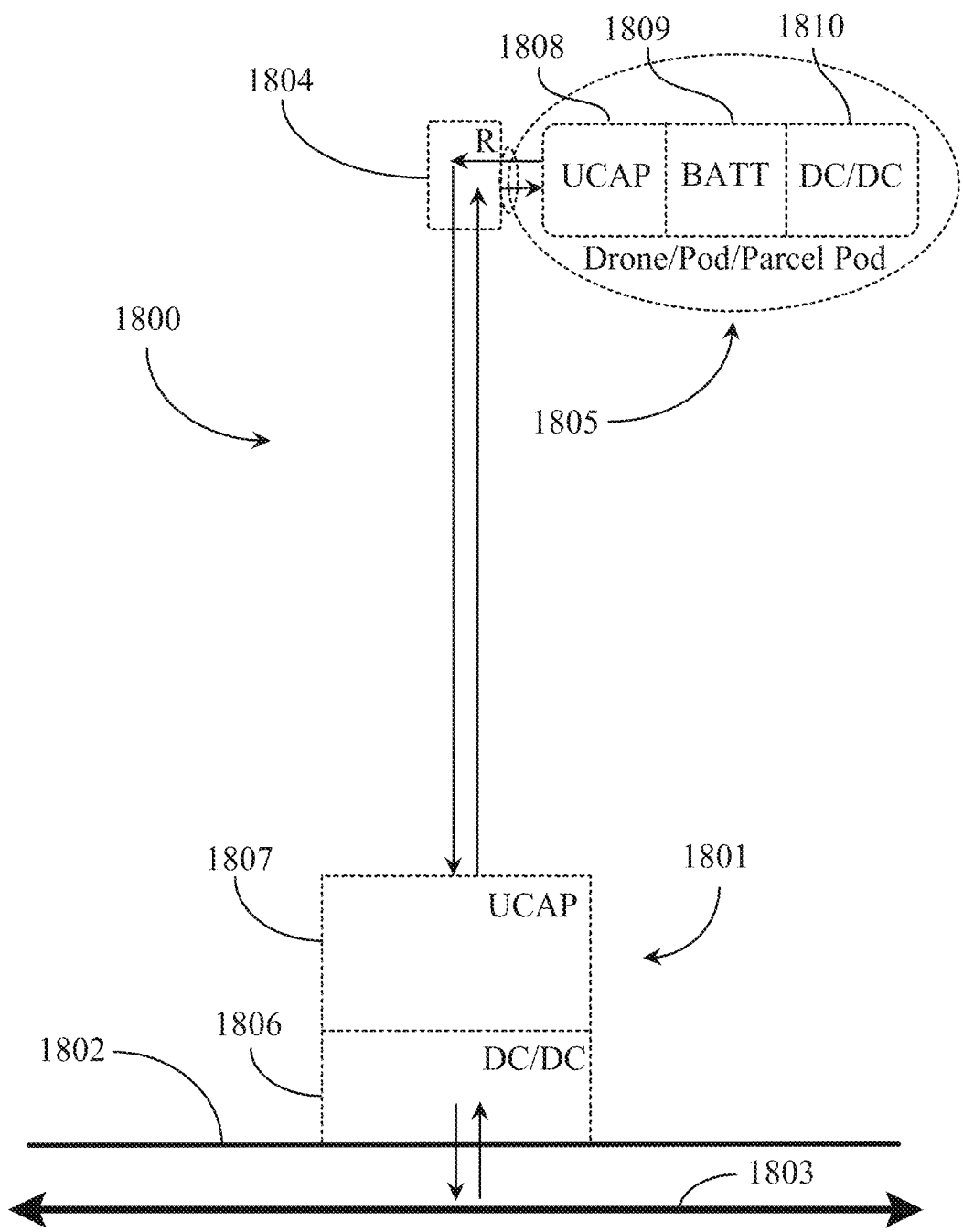
FIG. 18 is a block diagram depicting a charge path for a rail charging station pole adapted with at least one ultra-capacitor for transferring a high voltage in the form of a high voltage burst to another ultra-capacitor on board a drone/pod.

FIG. 18 is a block diagram depicting a logical charging path 1800 for a charging station pole adapted with at least one ultra-capacitor for transferring a high current in the form of a charge load to another ultra-capacitor on board a drone/pod. Diagram 1800 represents a typical charge path architecture. Power for charging travel vehicles along a travel route comes preferably from a power cable 1803 that is reliable and is accessed under ground level 1802. A pole controller 1801 includes a direct current to direct current converter (DC/DC) connected to an ultra-capacitor (UCAP) 1807. Power controller 1801 may take power from grid cable 1803 to fully load the pole capacitor 1807. The load value of ultra-capacitor 1807 may be selected and is preferably high enough to fully load individual ultra-capacitors like capacitor 1808 (UCAP) in travel vehicle 1805.

Power cable 1803 is below ground level 1802 in this example. This is not an absolute requirement but is preferred practice for safety. Pole controller 1801 may communicate with other controllers including a TSC like TSC 1612. Controller 1801 has data received from other controllers that may inform when power will next be required to charge one or more vehicles (incoming). The controller quickly processes the incoming data to determine how much current to load in ultra-capacitor 1807 for distribution to connected vehicles.

It is noted herein that vehicle battery charge capacities for vehicles traveling the transport infrastructure are known constants. Therefore, if four vehicle ultra-capacitors are contacting a slider or wireless pad location then ultra-capacitor 1807 may discharge enough current in a single discharge or smaller multiple discharges to load all four of those vehicle ultra-capacitors to capacity. An ultra-capacitor like ultra-capacitor 1808 may be designed to hold more than enough charge to fully charge battery (BATT) 1809.

In general flow, power on cable 1803 is harnessed by pole controller 1801 to load ultra-capacitor 1807 to a desired capacity for serving expected vehicles per RCN data. When vehicles arrive for charge, a slider apparatus R 1804 receives discharge from a load on ultra-capacitor 1807. A physical contact apparatus like a pair of conductive brushes or a current pick-up boot at the vehicle interface (slider adaptive) may receive the charge current from the slider to at least fully load ultra-capacitor 1808 for immediate or timed discharge into battery 1809. A DC/DC converter 1810 appropriates power from the battery to various pod and drone functions requiring power, primarily the drone motors for flight. In one embodiment, ultra-capacitor 1808 has a higher load capacity than battery 1809 and can therefore extend the life of battery 1809 under normal conditions.

Figure 19:
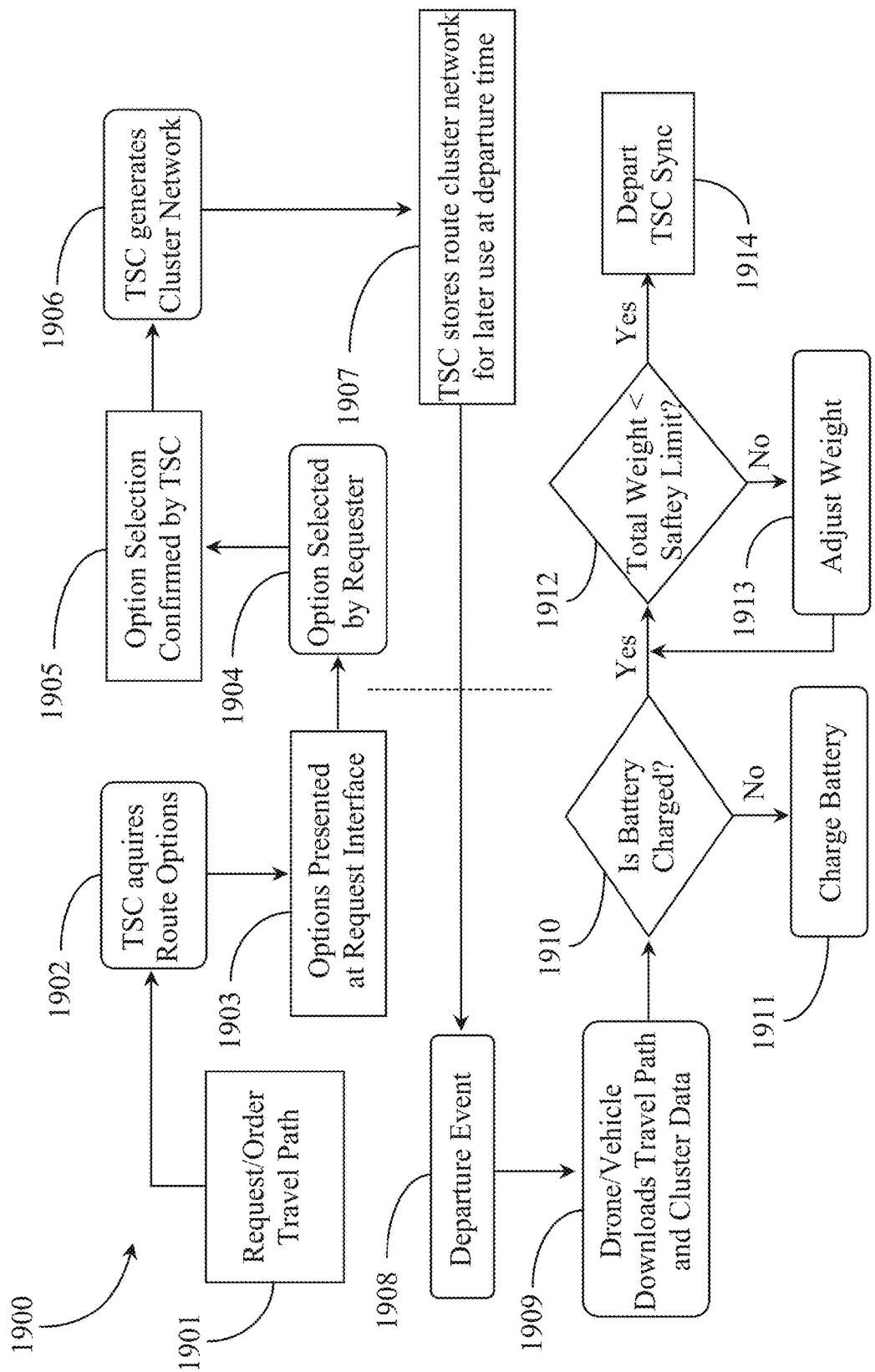
FIG. 19 is a process flow chart depicting steps for flight path negotiation confirmation, and generation of a cluster network of charging/exchange stations associated with a calculated flight path.

FIG. 19 is a process flow chart 1900 depicting steps for flight path negotiation confirmation, and generation of a cluster network of charging/exchange stations associated with a calculated flight path. At step 1901, a user or an agent representing group of users may book a travel event online or in person at an appropriate station. In one aspect, a local transportation system controller (TSC) like TSC 1612 of FIG. 16 may be alerted or called to retrieve best route options at step 1902 for the instant booking. In a fully diverse system, a route may involve exchanges of transportation mode, for example, from single passenger to multiple passenger drone-assisted vehicle to single passenger or multiple passenger rail pod to single passenger or multiple passenger pod car.

At step 1903, the route options may be presented to the administrator and to the booking entity for route selection. The requester may select a presented route option for the travel event at step 1904 and option selection may be confirmed by the TSC at step 1905. The TSC has record of all booked routes and may note that some route options may be unavailable if fully booked for a time. Route options may include other services where cost may vary from service to service and or a same route plan dependent on the time of travel. It is also noted herein a travel event may include a stop, a layover, and may include more than one type of transportation mode requiring an exchange of transportation mode at an exchange station.

At step 1906, the TSC generates a route cluster network (RCN) of stations that are to be engaged during the booked travel event primarily to ensure charging level of transport vehicles, but also to enable exchanges of transportation means during the travel event. The TSC seeks to provide the most economic routes for people working, doing business, etc. however, the system may also be used to book tours that have a route that includes all of the tourist locations and can be traveled in the most economical light considering power costs, entertainment during travel (i.e. movies, music, games), and so on.

When the TSC generates a RCN for a travel event, it may store the RCN data in a data repository in association with the identification data of the booking entity and the booked travel event at step 1907 for later use in association with the scheduled travel. In one aspect travel is booked by walk in users and the travel event happens as soon as it is cleared by the TSC. In another aspect travel events may be planned well ahead of time and scheduled out. In this aspect, travel events and RCNs generated for them may be canceled for example, if a user cancels a trip or does not appear at departure time.

In one aspect, the travel event is a one-time event booked by a user for themselves or for small travel groups like business associates, the user and a family member or friend, a small group (two to six) of political associates or other small groups traveling together with the same agenda and time line. In another aspect, the travel event may be a repetitive event for that user or group of users where the RCN may be preserved for repeated use, possibly under a blanket booking order that charges monthly or at some other period for transportation services for the user or group of users. This aspect enables use of the transportation infrastructure in the process of pickup and delivery of parcels, mail, purchased items, and so on where third party entities purchase a "delivery service" that may use the transport pods including drone-assisted parcel pods, rail supported freight or parcel pods, and ground based parcel pods or a combination thereof. For a trip that has a return trip there may be two RCNs generated, one for the trip to a destination and one for the return trip back to the starting point for the travel event.

At step 1908, a departure event occurs according to schedule or as soon as possible after booking and RCN confirmation. When a user or user group boards a travel vehicle for departure, that vehicle is a fully charged vehicle and ready to embark once loaded and weight checked for safety. At step 1909, the on-board computer of the travel vehicle may download RCN data for the travel event or may have that data pushed to it by the TSC during boarding or loading operations.

At step 1910, it may be determined whether the vehicle battery or batteries are fully charged as a last-minute safety check. Typically, a travel vehicle advanced to boarding has already been fully charged with respect to pod battery and other batteries (if used). If it is determined at step 1910 that a battery is not fully charged, the process may result in step 1911 where the travel vehicle is removed from service for charging and the user or users may board another vehicle. If in step 1911 it is determined that the battery or batteries are fully charged, the process may move to step 1912 where a determination may be made to confirm total weight and that the total weight in passenger cargo or parcels is below a weight limit determined safe for travel.

If it is determined at step 1912 that the total weight loaded into a travel vehicle is equal to or greater than a safety limit threshold value set for that travel mode and vehicle, then the process may move to step 1913 where the weight must be distributed or otherwise adjusted to come in under the weight limit threshold. If at step 1912 the weight total falls below the limit set for safety, then the travel vehicle may be released to travel and may sync data with the local TSC at step 1914.

In a preferred aspect, a departing vehicle cleared for travel immediately syncs status to the TSC so that the TSC may have record of actual start time and be able to compare that with generated RCN data. For example, in an RCN the TSC confirmed route has estimated arrival times (ETA) recorded for the travel vehicle at each stop. In one aspect, if a departure time is later than scheduled departure time, the time difference can be communicated up line, so all the stops have updated ETAs. This communication may happen autonomously in the RCN via stop to stop notification. In one aspect the TSC may pull up an RCN and make modifications to the data and push the new RCN data back to the traveling vehicle computer.

TSC support enables fast updating of RCN data in the light of detected or reported anomalies in the system. For example, keep traffic flow constant and evenly distributed along a travel route is desirable. RCNs for each traveling vehicle represent that vehicle's itinerary and may consider estimated parameters like meeting times, work periods, tour stops, route deliveries, etc. TSC may periodically monitor status of RCNs under its authority to help prevent bottle necking at one RCN charging station for example.

It is also possible that RCNs are dynamic and can be changed in real time such as in an emergency where an RCN designated charging station becomes full, unavailable, or must be shut down temporarily for maintenance. If that station is in an RCN another station within acceptable range between the previous station and the next station may be substituted therefor causing a drone-assisted vehicle, for example, to be diverted to the added station for charging. The TSC may continually update and adjust RCNs as required. Likewise, normal communications between charging stations on an RCN provide data such as ETA of a vehicle for scheduled charging.

In one aspect RCN fulfillment for travelers assigned an RCN is achieved autonomously with reporting to the TSC. If a situation arises that requires TSC intervention, it may be reported to the TSC for a travel event in progress and the TSC may take action to mitigate to keep traffic routed evenly throughout its portion of the transport infrastructure. In one aspect, a RCN may overlap a boundary between two TSC nodes. In that case authority may pass from one TSC to another when the travel vehicle crosses said boundary.

Figure 20:
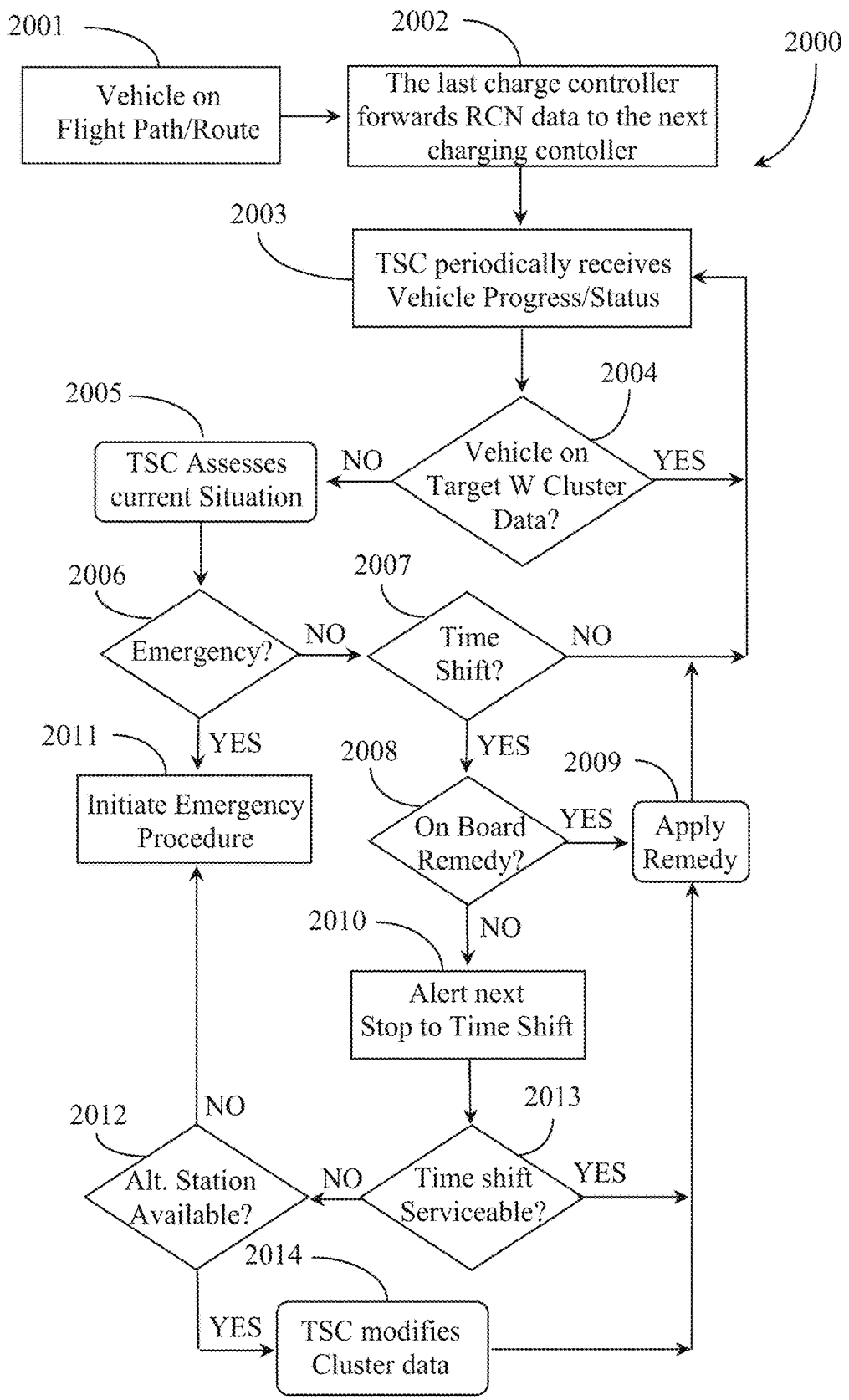
FIG. 20 is a process decision chart depicting a process for taking flight control of a drone for charging purposes and for releasing the drone back to system, passenger, or autopilot control to resume normal travel of the drone.

FIG. 20 is a process flow chart 2000 depicting a process for taking flight control of a drone=assisted vehicle for charging purposes and for releasing the travel vehicle back to system, passenger, or autopilot control to resume normal travel of the drone. At step 2001, a travel vehicle is in progress on a flight path or travel route including an RCN for mandating charging stops along the route.

At step 2002, the last-visited charging station controller analogous to the pole controller of FIG. 17 and included in the RCN for that vehicle may forward status data ahead to the next controller on the RNC for that vehicle. The TSC may be synced to by the on-board computer of the traveling vehicle when a travel event is executed for the purpose of record and enabling the TSC to check for conflicts. However, once the travel event is in progress, the RCN may manage traffic autonomously such as assigning a pole charging location and controlling decent and ascent flight parameters and speed for a vehicle approaching a charging station, for example.

At step 2003, a travel vehicle, in this case a drone-assisted vehicle periodically reports to the TSC giving current status relative to time, operation, and conditions. At step 2004 the TSC decides based on vehicle reporting at step 2003, whether that vehicle is still on target with the original RCN data on record. If at step 2004, the TSC determines that the travel vehicle is on target, the TSC performs no action and the process may loop back to periodic reporting of status from the vehicle. If at step 2004, the TSC determines that the travel vehicle is not on target with RCN data of record, the TSC may intervene at step 2005 and assess the current situation further.

At step 2006, the TSC may determine whether an emergency is unfolding relative to the reporting travel vehicle. The reporting travel vehicle has the RCN data and, in this case, flight data for the itinerary. If the TSC determines there is no emergency at step 2006, the process may move to decision step 2007 where the TSC may determine if a time shift in schedule has occurred. If no time shift has occurred at step 2007 requiring TSC intervention, then the process may loop back to step 2003 and the TSC receives subsequent reports.

Referring to step 2006, if there is an emergency situation unfolding with a travel vehicle, the TSC may initiate an emergency procedure to help mitigate the problem. The TSC has the updated RCN data and has access to emergency services available in the transport infrastructure. In one example, if a drone-assisted pod is required to make an emergency landing for a technical reason or weather related reason, the TSC may make arrangements to assist the vehicle by communicating to the vehicle system or operator steps to take in the landing attempt. One such step might include calling the closest available station to the travel vehicle affected and order a smart wheeled frame to drive to a potential landing spot so the drone-assisted vehicle might land on a fully charged means of transportation back to the station. Other steps may include taking full autopilot control of the vehicle, recommending nearby open spaces for landing, alerting local emergency responders, and so on.

If a drone-assisted vehicle has an emergency that obfuscates the current travel itinerary, the RNC for that travel vehicle may be canceled by the TSC. That cancellation may be pushed to the remaining stops including the exchange stations, the charging stations, and the final destination. Any other RCNs associated with the canceled RCN such as a return path RCN are also canceled. In one aspect, the subtraction of RCN data from the network may play a role in creating another RCN or modifying other RCNs in progress. For example, if a drone-assisted vehicle is having an emergency, other travel vehicles near the emergency may be notified to slow approach speed, return to the previous station, change elevation, hover periodically, or to proceed with caution. The TSC may update the RCN data for any vehicles that the TSC determines need to be rerouted to other stations or charge facilities.

Referring back to step 2007, if the TSC determines there is a time shift that negates recorded RCN data, the process may move to step 2008 where the TSC determines whether there is some on board remedy for mitigating the situation before ETA at the next stop. If the TSC determines there is an on-board remedy at step 2008 for the time shift of 2007, then the TSC may apply that remedy at step 2009 and the process ultimately resolves back to step 2003.

If the TSC determines there is no on-board remedy for the time shift at step 2008 then the process may move to step 2010 where the TSC may alert the next stop in the RCN for that vehicle to the time shift and allow the controller at the next stop to adjust its ETA data. The next stop may forward the new ETA data up line to subsequent stops. In this way traffic is managed along a flight path. As for piloting, the operator or pilot of a drone-assisted travel vehicle may receive mitigating suggestions from the TSC such as to change elevation, reduce speed, increase speed, hover for a period. In one aspect, the TSC may utilize remote control of a vehicle in certain conditions, for example to reduce or increase speed or to ascend or descend while the pilot is operating.

At step 2013, the next stop notified by the TSC may decide of whether it may accommodate the new ETA data or not. If the notified change is serviceable at step 2013, then the process resolves ultimately back to step 2003. However, if at step 2013, the notified stop in the RCN cannot service the time shift reasonably because of high traffic load or some other reason, the TSC may determine if there is an alternate charging station or facility with charging apparatus within range that can replace the next stop in the RCN. If at step 2012, no alternative station is available, the process may resolve back to step 2011 where the TSC may initiate emergency procedures. If at step 2012 there is an alternative station within range, the TSC may replace the affected station with the new station. In that case, the RCN is at least temporarily changed and at the next stop the change data may be forwarded up line to the rest of the RCN stops.

It will be apparent to the skilled person that the arrangement of elements and functionality for the invention is described in different embodiments in which each is exemplary of an implementation of the invention. These exemplary descriptions do not preclude other implementations and use cases not described in detail. The Uses and methods depicted within this description are purely emblematic of definitive ways in which to build and operate this invention and are not to be understood to be limiting of scope in any way. While the uses and methods have been described with a certain degree of particularity, it is to be noted that many alterations could be made in the details of the construction and the arrangement of the apparatus and its components without departing from the spirit and scope of this invention. The invention is limited only by the breadth of the claims below.

The invention claimed is:

1. A system managing charging of a battery-powered vehicle in a transportation infrastructure, comprising:
    a computerized control node having network connectivity to a wide area network (WAN) covering a geographic region;
    a plurality of vehicle charging facilities distributed within the geographic region covered by the WAN, individual ones of the vehicle charging facilities comprising a vertical post extending upward from a base at a ground surface, the post having two charging interfaces implemented at different heights on the vertical post, a charging zone proximate each charging interface through which the battery-powered vehicle passes while flying under power from an on-board battery, each charging interface adapted to engage with and to provide a charging current to a charge-receiving interface implemented on the battery-powered vehicle as the battery-powered vehicle flies through the charging zone; and
    a computerized charge controller connected to each one of the plurality of charging facilities;
    wherein the computerized control node, based on a starting point and a destination for the battery-powered vehicle within the geographic region, and preprogrammed range on a charged battery for the battery-powered vehicle, selects, prior to the battery-powered vehicle leaving the starting point, a specific grouping of the plurality of vehicle charging facilities and assigns that specific grouping of charging facilities as a route cluster network (RCN) of charging facilities for meeting charging requirements of the battery-powered vehicle traveling from the starting point to the destination, scheduling a charging event for the battery-powered vehicle at each of the vehicle charging facilities in the RCN, and wherein the battery powered vehicle flies through the charging zone with the charging interface and the charge receiving interface engaged, and the computerized charge controller controls providing the charging current.

2. The system of claim 1, wherein the battery-powered vehicle is a drone carrying a pod with a rechargeable battery.

3. The system of claim 1, wherein the vehicle charging facilities comprise dedicated charging stations and multiple purpose facilities that include a vehicle charging facility.

4. The system of claim 1, wherein the charging interface comprises at least one slider rail or one wireless pad oriented vertically.

5. The system of claim 1, wherein the computerized charge controller comprises a first ultra-capacitor for providing high charge current.

6. The system of claim 5, wherein the charge controller loads power into the first ultra-capacitor from an underground power cable.

7. The system of claim 6, wherein the charge controller directs discharge of the first ultra-capacitor to the charge transfer apparatus on demand.

8. The system of claim 7, wherein the battery-powered vehicle comprises a second ultra-capacitor separated from the first ultra-capacitor during charging.

9. The system of claim 8, wherein the charging interface is a slider rail and the charge receiving interface is a set of electric contact brushes connected to the second ultra-capacitor, the brushes making physical contact with the slider rail to take the transferred charge into the second ultra-capacitor from the first ultra-capacitor as the battery-powered vehicle moves through the charging zone.

10. The system of claim 9, wherein the second ultra-capacitor discharges current received from the first ultra-capacitor into the vehicle battery after the battery-powered vehicle has disengaged from the slider rail.

11. The system of claim 8, wherein the charging interface is a vertically oriented wireless pad and the charge receiving interface is a magnetic coil receiver connected to the second ultra-capacitor.

12. The system of claim 11, wherein the second ultra-capacitor discharges current received from the first ultra-capacitor into the vehicle battery after the electric vehicle has disengaged from the wireless pads.

13. The system of claim 1, wherein the battery-powered vehicle syncs with the computerized control node once a travel event is uploaded.

14. The system of claim 13, wherein the computerized control node periodically contacts the battery-powered vehicle to determine status.

15. The system of claim 1, wherein each charging facility charge controller communicates at least charge status and estimated time of arrival for the battery-powered vehicle to a next charging facility charge controller toward destination in the route cluster network.

16. The system of claim 1, wherein the charging facilities report service data regarding the battery-powered vehicle to the computerized control node as it occurs.

17. The system of claim 1, wherein the computerized control node periodically assesses route cluster network status for each active travel event.

18. The system of claim 1, wherein the computerized control node receives information from the battery-powered vehicle in an assigned route cluster network of an issue, or otherwise detects an anomaly with current travel status of that battery-powered vehicle and, after assessing the information, initiates one or more emergency procedures.

\* \* \* \* \*